US007263379B1

(12) United States Patent
Parkulo et al.

(10) Patent No.: US 7,263,379 B1
(45) Date of Patent: Aug. 28, 2007

(54) COMMUNICATIONS NETWORK FOR EMERGENCY SERVICES PERSONNEL

(75) Inventors: Craig M. Parkulo, Concord, NC (US); Wesley McChord Barbee, Oakboro, NC (US); Jerald Robert Malin, Matthews, NC (US); Jeffrey Lynn Landis, Waxhaw, NC (US); Matthew Shannon, Troutman, NC (US)

(73) Assignee: STI Licensing Corp., Beachwood, OH (US)

( * ) Notice: Subject to any disclaimer, the term of this patent is extended or adjusted under 35 U.S.C. 154(b) by 159 days.

(21) Appl. No.: 10/744,901

(22) Filed: Dec. 23, 2003

Related U.S. Application Data

(60) Provisional application No. 60/436,038, filed on Dec. 23, 2002.

(51) Int. Cl.
*H04Q 7/20* (2006.01)

(52) U.S. Cl. ................ 455/521; 455/404.1; 455/404.2; 455/557; 709/238; 709/243; 370/238; 370/254; 370/351; 340/501; 340/506; 340/532; 340/539.13; 340/539.17; 340/539.22; 340/539.27; 340/586; 340/870.17

(58) Field of Classification Search ................ 340/501, 340/505, 506, 532, 539.1, 539.13, 539.16, 340/539.17, 539.22, 539.27, 584, 589, 586, 340/693.5, 870.17, 539.11, 539.26; 455/66.1, 455/90.1, 90.2, 90.3, 100, 404.1, 404.2, 521, 455/428, 445, 507, 557; 701/207, 217, 300; 348/61, 83, 143, 150, 160, 161; 370/229, 370/238, 254, 351, 392, 408, 409; 709/238, 709/243
See application file for complete search history.

(56) References Cited

U.S. PATENT DOCUMENTS

| | | | | | |
|---|---|---|---|---|---|
| 5,864,481 | A | * | 1/1999 | Gross et al. | 700/90 |
| 5,950,133 | A | * | 9/1999 | Bledsoe | 455/439 |
| 5,990,793 | A | * | 11/1999 | Bieback | 340/573.1 |
| 6,091,331 | A | * | 7/2000 | Toft et al. | 340/539.11 |
| 6,100,806 | A | * | 8/2000 | Gaukel | 340/573.4 |
| 6,201,475 | B1 | * | 3/2001 | Stumberg et al. | 340/573.1 |
| 6,219,346 | B1 | * | 4/2001 | Maxemchuk | 370/338 |
| 6,285,857 | B1 | * | 9/2001 | Javitt | 455/15 |
| 6,333,694 | B2 | * | 12/2001 | Pierce et al. | 340/573.1 |
| 6,538,623 | B1 | * | 3/2003 | Parnian et al. | 345/8 |
| 6,549,845 | B2 | * | 4/2003 | Eakle et al. | 701/207 |
| 6,606,993 | B1 | * | 8/2003 | Wiesmann et al. | 128/204.23 |
| 6,675,091 | B2 | * | 1/2004 | Navab | 701/207 |
| 6,850,844 | B1 | * | 2/2005 | Walters et al. | 701/216 |

(Continued)

*Primary Examiner*—William Trost
*Assistant Examiner*—James D. Ewart
(74) *Attorney, Agent, or Firm*—Rick Comoglio; Dean D Small; Small Patent Law Group

(57) ABSTRACT

A personal multimedia communication system and network for emergency services personnel includes a plurality of personal communication systems linked together and to a base station in a network. Each personal communication system includes a PDA device mounted on a PASS control console, a video camera mounted on the PDA device, a GPS unit, a microphone, and other electronic devices. The various electronic devices are all communicatively connected to the PDA device. Data from the various devices may be collected in the PDA device and wirelessly transmitted to any other node or device in the network, including other personal communication devices. Each personal communication device may serve as a repeater, thus providing a wireless communications link between a device located out of range of the base station.

44 Claims, 15 Drawing Sheets

U.S. PATENT DOCUMENTS

| | | | | |
|---|---|---|---|---|
| 6,894,610 | B2* | 5/2005 | Schubert et al. | 340/531 |
| 6,999,441 | B2* | 2/2006 | Flammer et al. | 370/337 |
| 2001/0034793 | A1* | 10/2001 | Madruga et al. | 709/238 |
| 2002/0008625 | A1* | 1/2002 | Adams et al. | 340/573.1 |
| 2002/0058508 | A1* | 5/2002 | Pallas et al. | 455/435 |
| 2002/0065594 | A1* | 5/2002 | Squires et al. | 701/48 |
| 2002/0065868 | A1* | 5/2002 | Lunsford et al. | 709/200 |
| 2002/0135488 | A1* | 9/2002 | Hibbs et al. | 340/584 |
| 2002/0159409 | A1* | 10/2002 | Wolfe et al. | 370/329 |
| 2002/0188402 | A1* | 12/2002 | Huang et al. | 701/213 |
| 2003/0078029 | A1* | 4/2003 | Petite | 455/404 |
| 2003/0165128 | A1* | 9/2003 | Sisodia et al. | 370/338 |
| 2003/0214397 | A1* | 11/2003 | Perkins et al. | 340/524 |
| 2004/0001442 | A1* | 1/2004 | Rayment et al. | 370/238 |
| 2004/0004547 | A1* | 1/2004 | Appelt et al. | 340/573.1 |
| 2004/0008663 | A1* | 1/2004 | Srikrishna et al. | 370/351 |
| 2004/0070515 | A1* | 4/2004 | Burkley et al. | 340/825.49 |
| 2004/0088584 | A1* | 5/2004 | Shachar et al. | 713/201 |
| 2005/0185606 | A1* | 8/2005 | Rayment et al. | 370/328 |
| 2006/0120370 | A1* | 6/2006 | Ginchereau et al. | 370/392 |

* cited by examiner

COMMUNICATIONS NETWORK FOR EMERGENCY SERVICES PERSONNEL

CROSS-REFERENCE TO RELATED APPLICATION

This application is entitled to the benefit of, and claims priority to, provisional U.S. patent application Ser. No. 60/436,038 filed Dec. 23, 2002 and entitled "HANDHELD MULTIMEDIA COMMUNICATION SYSTEM FOR FIREFIGHTERS," the entirety of each of which is incorporated herein by reference.

BACKGROUND OF THE PRESENT INVENTION

1. Field of the Present Invention

The present invention relates to communication systems for firefighters, and, in particular, to handheld devices carried by firefighters and other emergency services personnel for collecting, displaying, wirelessly transmitting, and wirelessly receiving multimedia data in hazardous environments.

2. Background

Traditionally, the equipment carried into fires and other hazardous environments by firefighters and other emergency services personnel (generally referred to herein as "firefighters") has been primarily mechanical, with the most important piece of equipment being a self-contained breathing apparatus ("SCBA") for providing the wearer with breathable air. Conventional SCBA's generally include a facepiece, one or more pressurized cylinder or tank, and a hose. The facepiece, which covers the wearer's nose, mouth and eyes and includes a lens for external viewing, is supplied with air from the tanks via the hose. The tanks are secured to the wearer's body by a harness or backpack. One or more gauges are typically supplied to tell the user how much air remains in the tank.

More recently, firefighters have begun carrying a variety of auxiliary equipment on their backpacks or their headgear. Of this additional equipment, one of the most important items is a personal alarm safety system ("PASS") device. This device typically includes a motion sensor for monitoring whether the wearer has become motionless, thus indicating a potential injury or other debilitating condition for the wearer which may be signaled with audible or visual alarms or alert signals. The PASS device may also be integrated with a pressure gauge, thus serving multiple functions. The pressure gauge portion of the PASS device may be separated from the motion sensor portion to permit the user to look at the gauge when desired while positioning the motion sensor on the backpack. However, most PASS devices or systems are incapable of alerting personnel other than the wearer using any method other than the audible or visible alert signals generated by the PASS devices themselves, which has been a serious shortcoming of such devices.

This problem was partially solved with the development of an advanced PASS device which was capable of transmitting data from the PASS device back to a central location. The Scott Emergency Management System ("SEMS"), manufactured by Scott Health & Safety of Monroe, North Carolina, uses transmitting PASS devices, each carried by an individual firefighter, to transmit PASS data back to a central base station. However, the SEMS devices use a point-to-point protocol, wherein data received from the PASS device may only be transmitted as full duplex radio data directly to a dedicated base station. This technology limits the range of the Scott SEMS device. This limitation can be overcome by deploying repeaters to allow greater effective transmission distances from individual transmitting PASS devices. Unfortunately, using repeaters to relay the information has shortcomings in firefighting environments. First, time must be taken to place the repeaters in key locations in and around the burning building or other firefighting environment in order to have the ability to have at least one repeater within range of every firefighter and the base station. In addition, the repeaters are not mobile, and each will remain in a single location until it is physically moved to another one, which is also time consuming. Further, in a building fire it is not always possible to retrieve the repeater if dropped inside the building due to changes in the building environment. Thus, a more flexible and effective transmitting PASS system is needed.

In addition, there has been an increased emphasis in recent years on the development of other electronic devices to be carried by firefighters. These include heads up displays ("HUDs") for displaying tank pressure or other information to a user directly in his line of sight; video cameras, and particularly thermal imaging cameras, for capturing visual data or for use in seeing through dense smoke, recognizing areas of thermal stress, and the like; GPS devices for giving a firefighter information about his location, and many other devices. In addition, additional onboard sensors have been developed or are being developed for monitoring biometric conditions of the firefighter, environmental conditions, additional equipment information, and many other conditions and data. Still further, firefighters continue to carry audio communications devices such as radios and the like to facilitate communications between firefighters or to a command center located outside the immediate area of danger.

Unfortunately, until now there has been no effort to consolidate all of this information in a single location, or to communicate multiple different types of data from one firefighter to another or from one firefighter to a command center using a single device. This means that there is no central location or device carried by a firefighter on which he may view or otherwise receive multiple different types of data, thereby avoiding the problem of having to check or consult different devices to receive different types of data. Moreover, it has been impossible to correlate data of one type with data of another type without going through a tedious manual process, if such a correlation is possible at all. For example, it is difficult if not impossible with current systems and devices to correlate GPS data captured over time by a firefighter's GPS device with video data captured by a thermal imaging camera carried by the same firefighter. Likewise, it has been difficult or impossible to correlate audio signals, video signals or data, positional data, biometric data, environmental data, SCBA status information and other data using either the firefighter's current equipment or at the command center using data transmitted from the firefighter thereto.

Thus, a convenient, robust, handheld solution to all of these problems is needed in order to improve the effectiveness of firefighters and other emergency services personnel.

SUMMARY OF THE PRESENT INVENTION

The present invention comprises a personal multimedia communication system and network for firefighters and other emergency services personnel. The communication system and network may include a PDA device, a PASS system and a video camera, where the PDA device includes a GPS subsystem, a PASS interface, a video input, and a wireless network interface for communicating with a wireless LAN. Broadly defined, the present invention according to one aspect is a method of communicating multimedia data from a personal communication system carried by a firefighter to a base station including: gathering multimedia data at a first personal communication system carried by a first firefighter in a hazardous environment; wirelessly broadcasting at least some of the data using a standard protocol; receiving, at a second personal communication system carried by a second firefighter, the data broadcast by the first personal communication system; upon receiving the data at the second personal communication system, wirelessly broadcasting the data using the standard protocol; and receiving, at a base station, the data broadcast by the second personal communication system.

The present invention, according to another aspect of the present invention, includes a personal communication system for use by a firefighter in a hazardous environment, including: a PASS system, the PASS system including a PASS unit to be carried directly on a firefighter's backpack and a PASS control console to be hung from the backpack, the PASS control console being connected to the PASS unit by at least a communications interface; and a PDA device, releasably mounted on the PASS control console and electrically connected to the PASS control such that data from the PASS unit may be transmitted to the PDA device via the PASS control console.

In features of this aspect, the personal communication system further includes a video camera releasably mounted on the PDA device and electrically connected to the PDA device such that video data from the video camera may be transmitted to the PDA device; and the video camera is a thermal imaging camera.

The present invention, according to another aspect of the present invention, includes a personal communication system for use by a firefighter in a hazardous environment, including: a support apparatus to be worn by a firefighter in a hazardous environment; a first onboard data source carried by the support apparatus; a second onboard data source carried by the support apparatus; and a PDA device communicatively connected to both the first onboard data source and the second onboard data source.

In feature of this aspect, the first onboard data source is a PASS system; the PDA device has a display adapted to display data from both the first onboard data source and the second onboard data source; the PDA device has a wireless transmitter adapted to transmit data from both the first onboard data source and the second onboard data source; the second onboard data source is a video camera, a microphone, a GPS device, a biometric sensor for measuring the body temperature, pulse rate or $CO_2$ level of the firefighter, or an environmental sensor for measuring the environmental temperature or sensing gas.

The present invention, according to another aspect of the present invention, includes a method of communicating at least two types of multimedia data from a personal communication system carried by a firefighter to a remote location, including: gathering a first stream of multimedia data of a first data type; communicating the first stream of multimedia data of the first data type to a computer device in a personal communication system carried by a firefighter; gathering a second stream of multimedia data of a second data type; communicating the second stream of multimedia data of the second data type to the computer device; wirelessly transmitting the first and second streams of data from the computer device to a remote location; receiving the first and second streams of data from the computer device at the remote location; and correlating the first stream of data with the second stream of data.

In features of this aspect, the correlating step takes place in the computer device before transmission; the correlating step takes place at the remote location after receiving the first and second streams of data; the first data type is a reading of a motion sensor in a PASS system, the first stream of multimedia data is a set of such readings, and the second data type is a physical location reading, a video image, or an audio signal; the first data type is a physical location reading (such as a GPS reading), the first stream of multimedia data is a set of such readings, and the second data type is a video image or an audio signal; and the first and second streams of data are gathered at sequential points in time, and correlating the first stream of data with the second stream of data includes time-synchronizing the two streams of data.

The present invention, according to another aspect of the present invention, includes a method of communicating positional data from a personal communication system carried by a firefighter to a remote location, including: providing a personal communication system, the personal communication system including at least a positional data gathering device and a wireless transmitter; gathering, via the positional data gathering device, positional data indicative of the physical location of the personal communication system; and transmitting the positional data to a remote location via the wireless transmitter.

In features of this aspect, the positional data gathering device is a GPS unit; the positional data gathering device is a dead reckoning device; and the method further includes providing, at the remote location, a base GPS unit, receiving, at the remote location, the positional data transmitted from the personal communication system, comparing the received positional data with positional data from the base GPS unit, generating data indicative of the comparison, and wirelessly transmitting the comparison data to the personal communication system.

The present invention, according to another aspect of the present invention, includes a communications network for emergency personnel, including: a plurality of personal communication systems, each carried by a firefighter in a hazardous environment, wherein each personal communication system including a PDA device connected to at least one onboard data gathering device carried by the firefighter and having a wireless transceiver, and wherein each personal communication system is adapted to send and receive signals from at least some of the other personal communication systems; and a base station adapted to send and receive wireless signals from at least some of the personal communication systems.

In features of this aspect, the at least one onboard data gathering device in each personal communication system includes a PASS system; the at least one onboard data gathering device in each personal communication system includes a positional data gathering device; the positional data gathering device in each personal communication system is a GPS unit; the at least one onboard data gathering device in each personal communication system includes a video camera; and the video camera in each personal communication system is a thermal imaging camera.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
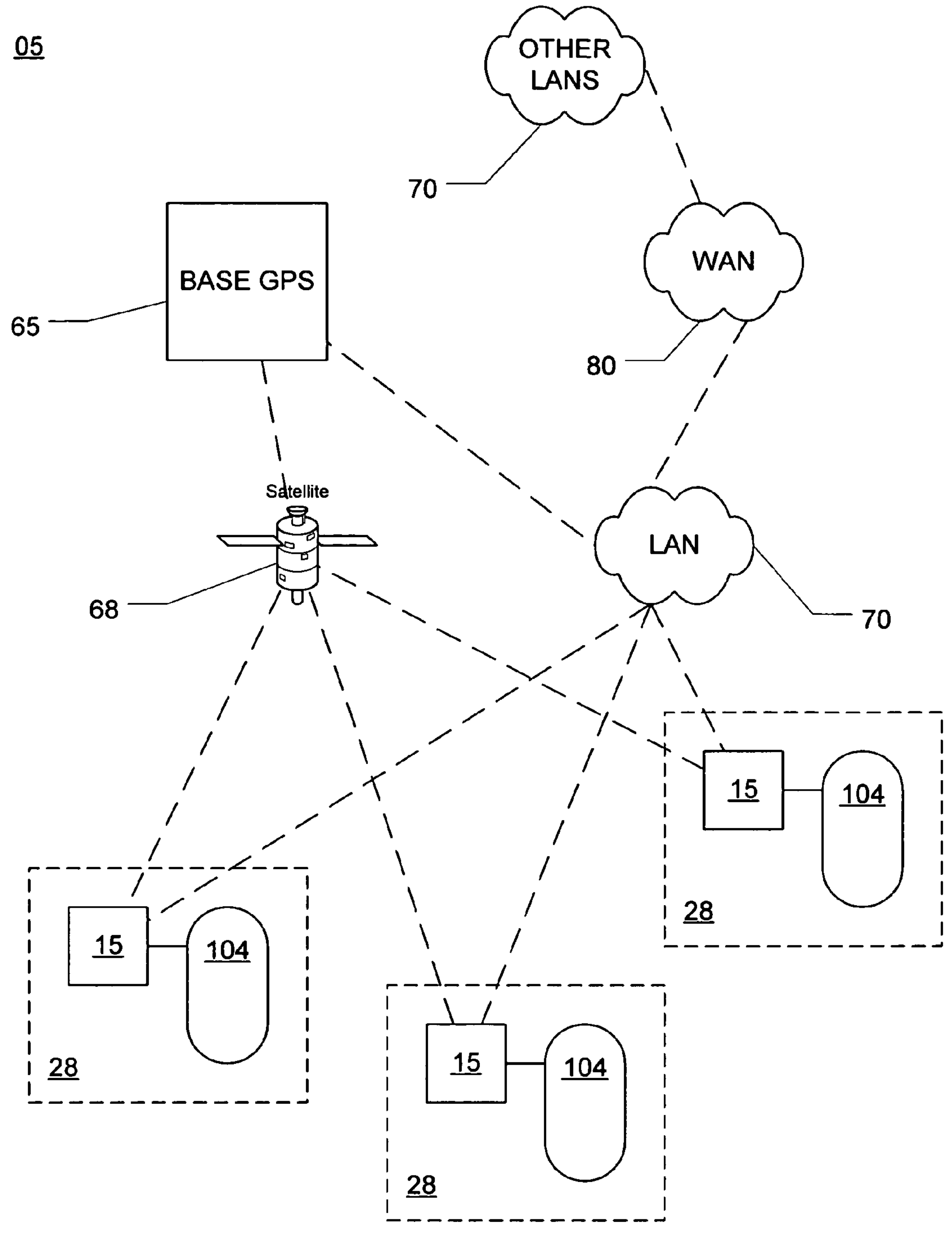
FIG. 1 is a block diagram of a personal multimedia communication system and network in accordance with a preferred embodiment of the present invention.

Referring now to the drawings, in which like numerals represent like components throughout the several views, a handheld multimedia communication system for firefighters and other emergency services personnel is hereby described. FIG. 1 is a block diagram of a personal multimedia communication system and network 05 in accordance with a preferred embodiment of the present invention. As illustrated therein, the system and network 05 may include one, and typically a plurality, of personal communication systems 15 interlinked with a truck-based global positioning system ("GPS") unit 65, the GPS satellite constellation 68, a local area network ("LAN") 70, and a wide area network ("WAN") 80. Other LANS 70 may likewise be linked to the system and network 05 via the WAN 80, but in order to simplify the discussion, only one LAN 70 will generally be discussed and illustrated herein.

Figure 3:
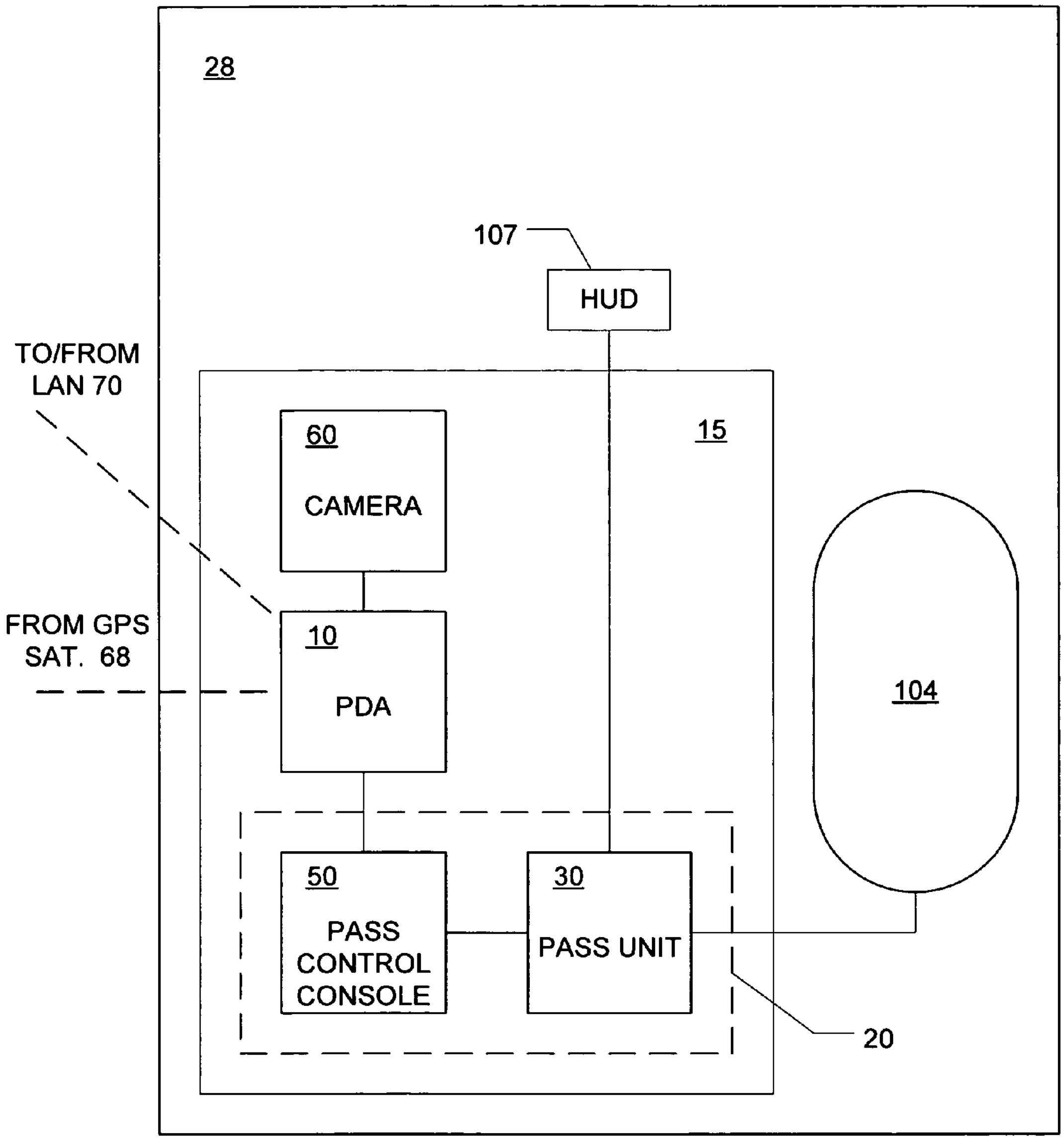
FIG. 3 is a block diagram of one of the personal communications systems of FIG. 1.

Each personal communication system 15 is designed to be carried by an individual firefighter or other emergency services personnel as part of his equipment 28. As shown in FIG. 1, firefighters and many other emergency services personnel that enter a dangerous environment typically carry an air tank 104 as part of a self-contained breathing apparatus ("SCBA"), but the equipment 28 may include a number of other components as well. FIG. 3 is a perspective view of equipment 28 carried by a firefighter or another emergency services worker in accordance with a preferred embodiment of the present invention. As illustrated therein, the equipment 28 may include a collection of conventional firefighting or safety equipment mounted on a backpack 101, as well as headgear 105, worn on the user's head and connected to the air tank 104 by a first pressure line 102, for supplying breathable air from the air tank 104 to the user's mouth and nose.

FIG. 3 is a block diagram of one of the personal communications systems 15 of FIG. 1. As shown, each personal communications system 15 may include a Personal Alert Safety System ("PASS") system 20, a personal digital assistant ("PDA") device 10, a video camera 60 and a "heads-up" display ("HUD") 107. Like many conventional PASS systems, the PASS system 20 of the present invention preferably includes both a PASS unit 30 and a separate PASS control console 50, and the PASS unit 30 may be carried conventionally in a recess in the user's backpack 101, while the PASS control console 50 preferably hangs from the end of a second pressure line 106, connected via a pressure reducer to the air tank 104, and a reinforced electronics cable sheath 103. The HUD 107 may be of conventional design, connected to the other electronic components via an electronics cable which is preferably integral with the second pressure line 106 but may also be separate if necessary. The PDA device 10 may be communicatively coupled to the PASS control console 50, and the camera 60 may be communicatively coupled to the PDA device 10.

Figure 2:
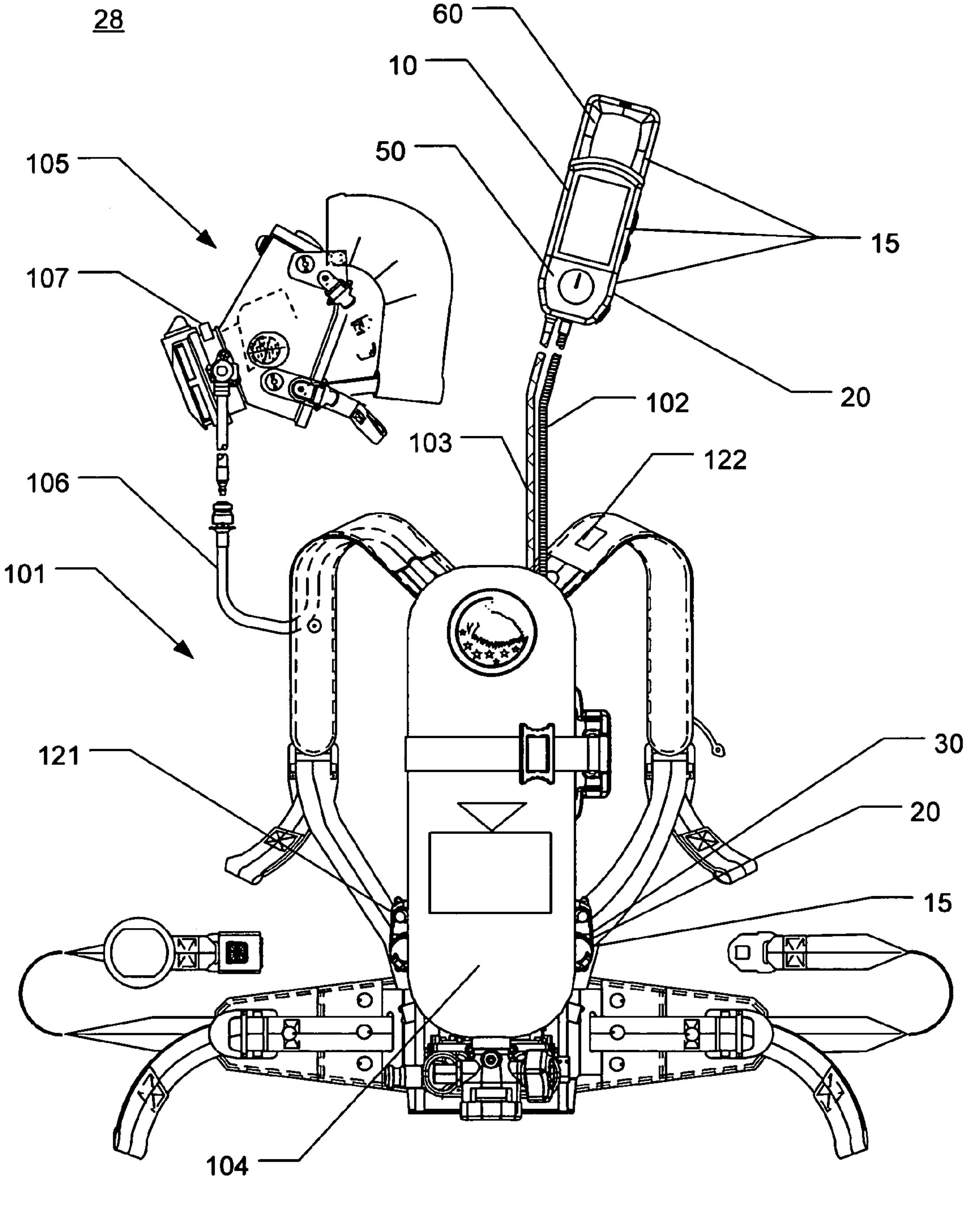
FIG. 2 is a perspective view of equipment carried by a firefighter or another emergency services worker in accordance with a preferred embodiment of the present invention.
Figure 4:
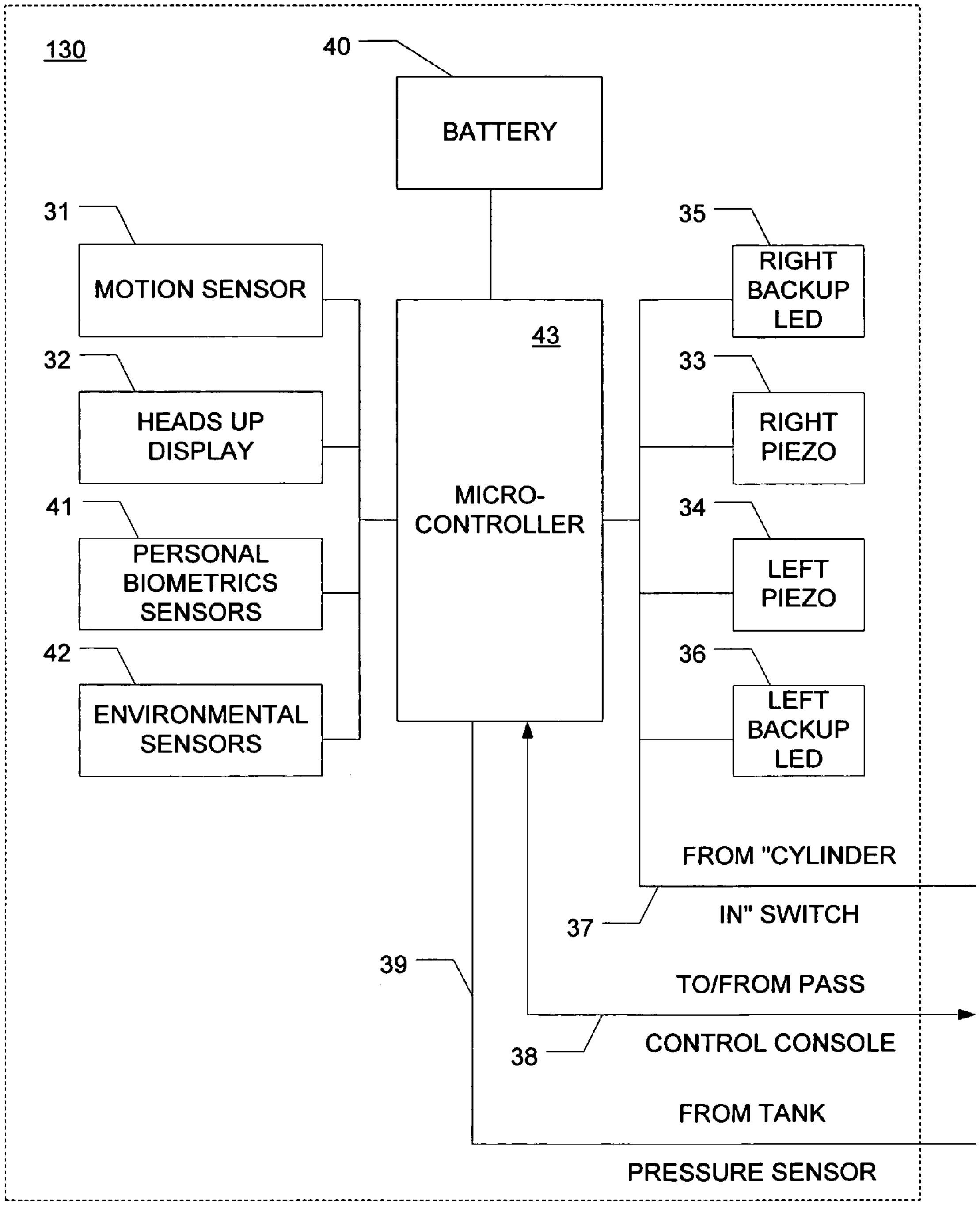
FIG. 4 is a block diagram of the internal computer hardware system of the PASS unit of FIGS. 2 and 3.

FIG. 4 is a block diagram of the internal computer hardware system 130 of the PASS unit 30 of FIGS. 2 and 3. The internal computer hardware system 130 for each PASS unit 30 preferably includes a microcontroller 43, a motion sensor module 31, a HUD interface 32, one or more piezo alarms 33, 34, one or more LED's 35, 36, an input 37 from a "cylinder in" switch, a PASS control console interface 38, a tank pressure sensor input 39 and a battery 40. The motion sensor module 31 preferably includes a tri-axial magnetometer and a tri-axial accelerometer to provide an inertial guidance system as well as being operative with the microcontroller 43 to provide an indication as to whether the PASS unit 30 has been motionless for a predetermined period of time. However, a simple motion sensor function (without the inertial guidance feature) may likewise be provided by a simple mechanical sensor of conventional design.

The HUD interface 32 enables data, signals or the like to be communicated between the PASS unit 30 and the HUD unit 107 located on headgear worn by the user carrying the PASS unit 30. The piezo alarms 33, 34, which preferably include a right-side piezo alarm 33 and a left-side piezo alarm 34, are sound generators that may be used to create a variety of sound patterns and are activated in a variety of circumstances, such as when the motion sensor module 31 indicates that the PASS unit 30 has been motionless for the predetermined period of time, when an air tank is installed or removed, when air pressure is low, when radio communications have been lost, or in order to alert the user that he should look at the display. Piezo alarms such as these are included on PASS systems sold by Scott Health and Safety of Monroe, North Carolina. The LED's 35, 36, which preferably include a right-side LED 35 and a left-side LED 36, are backup lights that are activated when the motion sensor module 31 indicates that the PASS unit 30 has been motionless for the predetermined period of time. The "cylinder in" input 37 receives an indication from a SCBA as to whether an air tank 104 has been installed therein or not. The PASS control console interface 38 provides communication between the PASS unit 30 and the PASS control console 50. This interface 38 may be an IC2, CAN, RS-232, RS-485 or the like communication bus. The tank pressure sensor input 39 receives input from a pressure sensor, located on the air tank 104, as to the amount of air remaining in the air tank 104 based on the amount of pressure or other related variable. The PASS unit 30 may be any conventional PASS unit having the functionality described above. One PASS unit 30 suitable for use with the present invention is the standard PASS unit manufactured by Scott Technologies of Monroe, N.C.

The PASS unit 30 may also include other sensor devices and interfaces. These may include, but are not limited to, personal biometric sensors 41, for monitoring physiological characteristics of the wearer and the like, and environmental sensors 42, for monitoring environmental characteristics such as temperature, the presence of gas, and the like. Biometric sensors 41 may be IC's for measuring the body temperature of the firefighter, the firefighter's pulse rate or $CO_2$ levels and the like and are preferably located inside the housing of the PASS unit 30. The environmental sensors 42 are also circuits and may be located inside or outside the housing. One commercially-available module having such environmental sensor is an external module, available from Scott Health & Safety of Lancaster, New York, that communicates with the microcontroller 43 via IC2, CAN, RS-232, RS-485 or the like.

Figure 5:
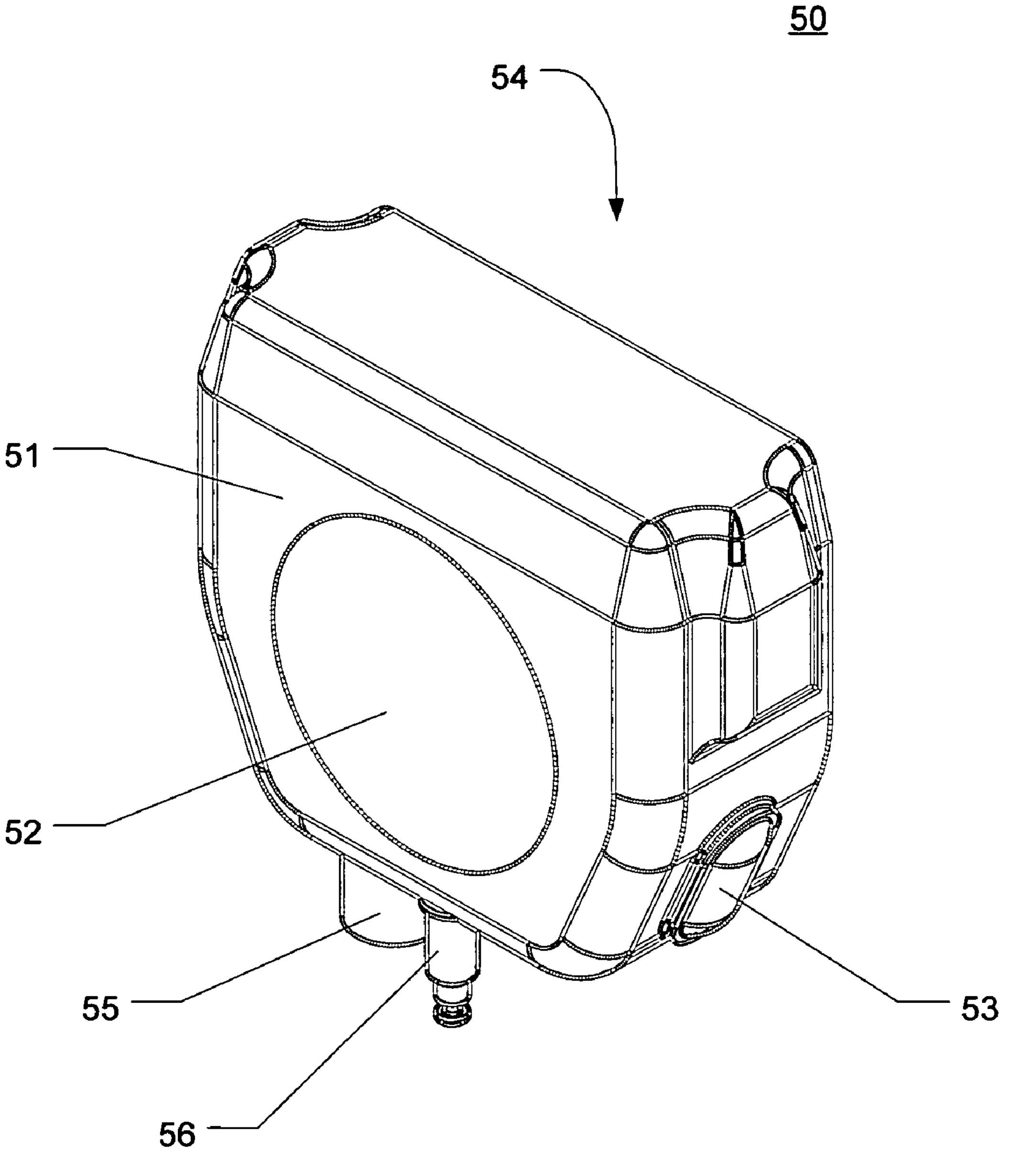
FIG. 5 is a perspective view of the PASS control console of FIGS. 2 and 3.

FIG. 5 is a perspective view of the PASS control console 50 of FIGS. 2 and 3. The PASS control console 50 includes a housing 51, a pressure gauge 52, one or more pushbuttons 53, a docking interface 54, a PASS unit interface 55, a pressure line input 56, an internal computer hardware system 150, illustrated in FIG. 6, and a corresponding software system. The housing 51 is designed to accommodate the other components and is preferably of heavy-duty, hardened construction, the design of which would be apparent to one of ordinary skill in the art. The pressure gauge 52, which is preferably an analog gauge and display, although other gauge and display technologies may be suitable as well, provides an indication as to the amount of air remaining in the air tank 104 based on the amount of pressure detected at the pressure line input 56, which is connected to the second pressure line 106 to the air tank 104, or other related variable. The pushbuttons 53, which preferably include at least a reset button and a manual alarm, may be disposed in any convenient location in the housing 51 and may be of conventional heavy-duty construction. The docking interface 54 is preferably located on the back of the PASS control console 50 in order to provide a mounting and connection location for the PDA device 10, as described hereinbelow, and includes an appropriately-shaped surface or surfaces in the housing 51, and one or more latches (not shown) for releasably locking the PDA device 10 to the PASS control console 50. The latches, which preferably each include a quick release mechanism, may be disposed, for example, on the sides or back of the PASS control console 50. To assemble the PDA device 10 to the PASS control console 50, the user may simply align the two devices 10, 50 and push them together, causing the latches to lock the PDA device 10 in place automatically. To release the PDA device 10, the same latches may simply be depressed, preferably at the same time. The PASS unit interface 55 provides communication between the PASS control console 50 and the PASS unit 30.

Figure 6:
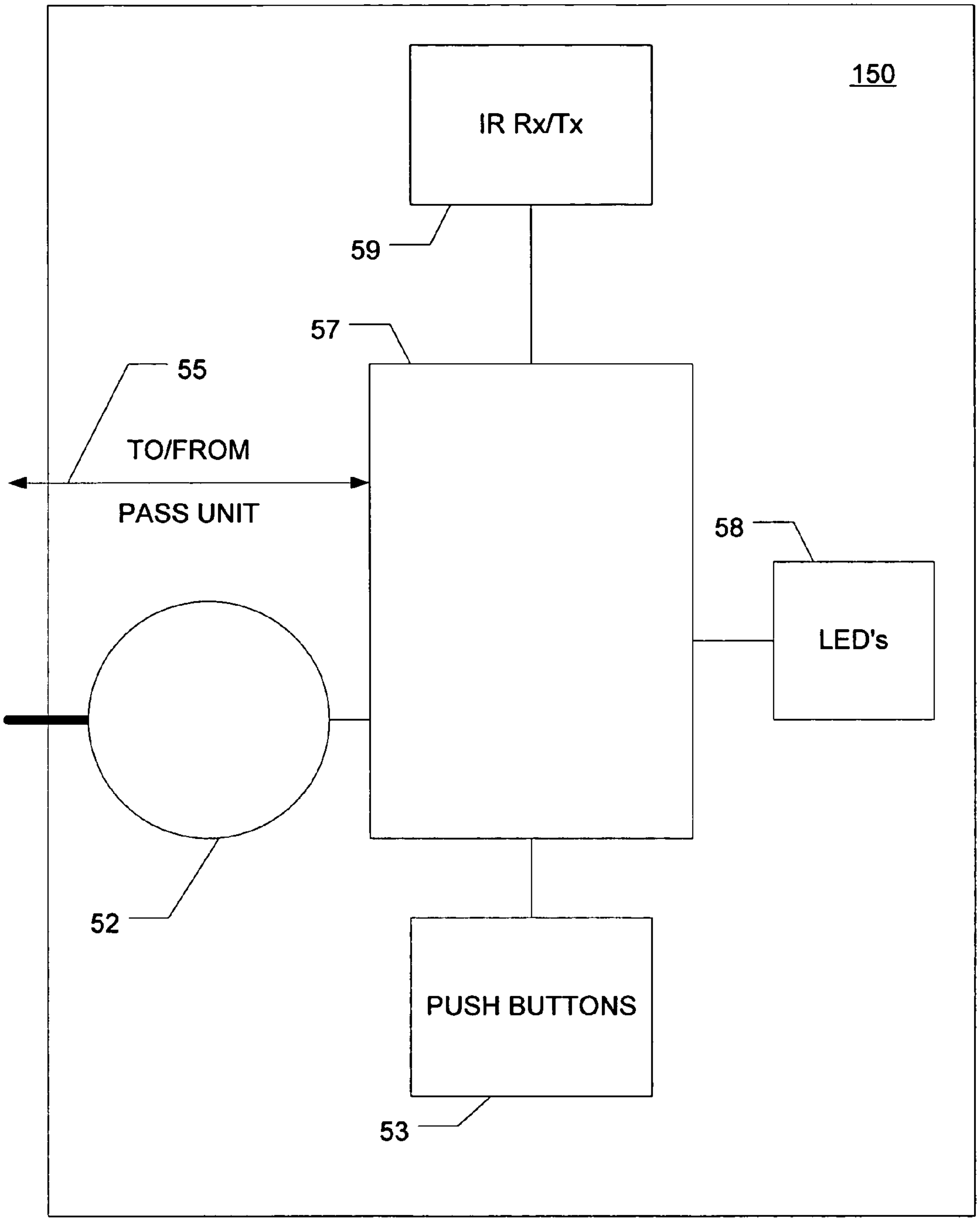
FIG. 6 is a block diagram of the internal computer hardware system of the PASS control console of FIG. 5.

FIG. 6 is a block diagram of the internal computer hardware system 150 of the PASS control console 50 of FIG. 5. The internal computer hardware system 150 for each PASS control console 50 preferably includes a microcontroller 57, the PASS unit interface 55, an interface to the pressure gauge 52, the pushbuttons 53 described previously, one or more visual indicators 58, such as LED's, and an infrared transceiver 59. Briefly described, the interface to the pressure gauge 52 permits pressure data to be communicated to the microcontroller 57, and the infrared transceiver 59 is mounted externally to permit line-of-sight infrared communication with a PDA device 10 when the PASS control console 50 and the PDA device 10 are docked together. Many of the components of the internal computer hardware system 150 may be conventional components such as those found in the standard PASS control console manufactured by Scott Technologies of Monroe, N.C.; however, modifications, apparent to one of ordinary skill in the art, must be made to a conventional PASS control console to make it suitable for use with the present invention.

Figure 7:
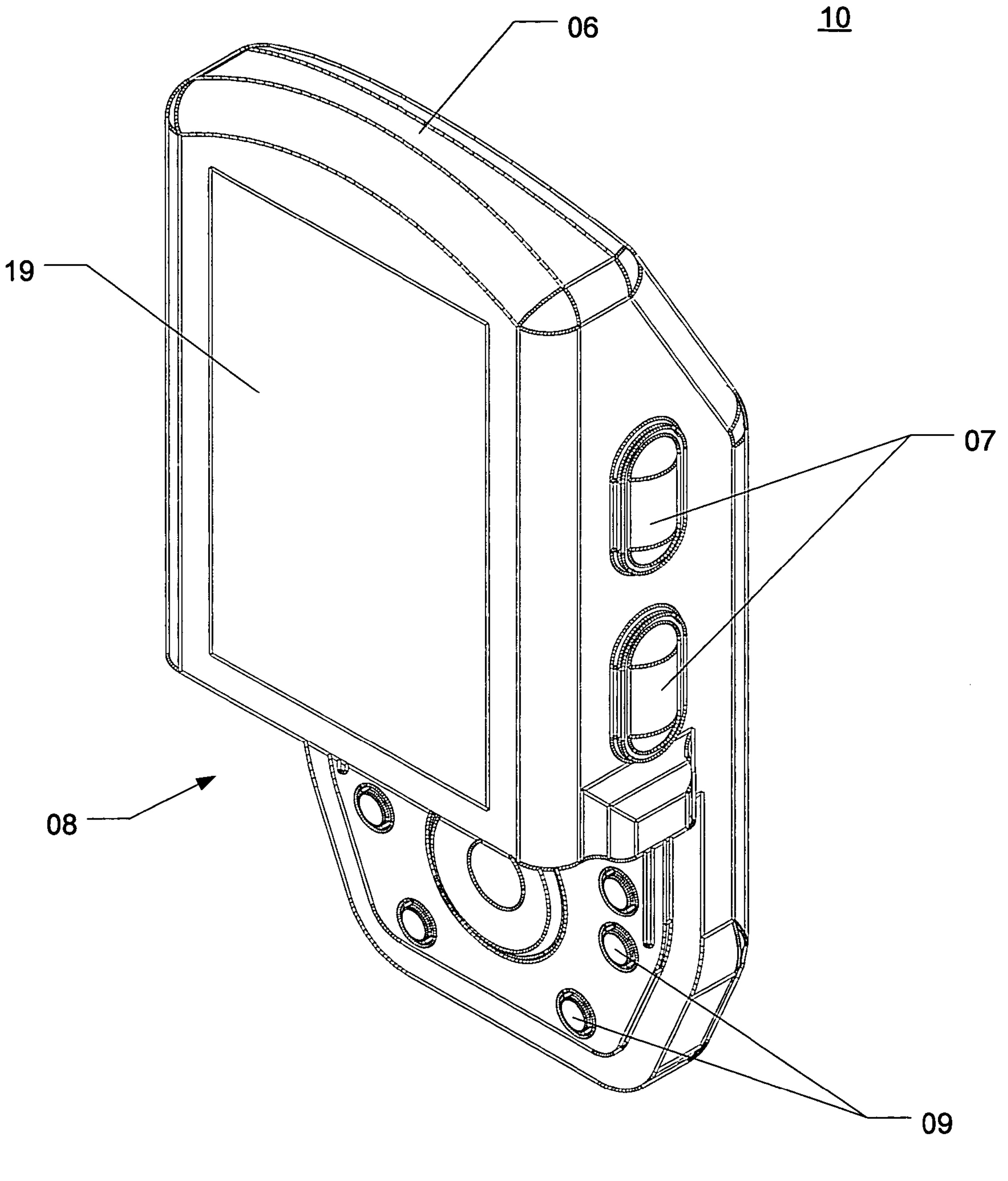
FIG. 7 is a perspective view of the PDA device of FIGS. 2 and 3.

FIG. 7 is a perspective view of the PDA device 10 of FIGS. 2 and 3. As used herein, the term "PDA device" is generally understood to mean any user device having a microprocessor, a display, and a user interface for controlling the operation of the device, and shall include any device having the components and general functionality of any conventional PDA device, but it will be understood that the PDA device 10 of the present invention may further include additional components and functionality as described herein below. The PDA device 10 includes a housing 06, a display 19, one or more pushbuttons 07, a keypad 21 (shown only in FIG. 8), a docking station 08, an internal computer hardware system 110 (illustrated in FIG. 8), and a corresponding software system. The housing 06 is designed to accommodate the other components and is preferably of heavy-duty, hardened construction, the design of which would be apparent to one of ordinary skill in the art. The display 19 is preferably a liquid crystal display ("LCD") with backlight of a type found generally on conventional PDA's; however, other displays, including displays using conventional, organic or polymer LED technology, may be suitable as well. The pushbuttons 07 may be disposed in any convenient location in the housing 06 and may be of conventional heavy-duty construction, while the keypad 21 may be hidden from view when the PDA device 10 is docked with the PASS control console 50 in order to better protect it. The docking station 08 is preferably located at the bottom of the PDA device 10 in order to permit it to be mounted on the PASS control console 50, as described hereinbelow, and includes an appropriately-shaped recess in the housing 06, one or more electrical contacts 09 and one or more latches (not shown) for releasably locking the PDA device 10 and at least a portion of a corresponding PASS system 20 together.

Figure 8:
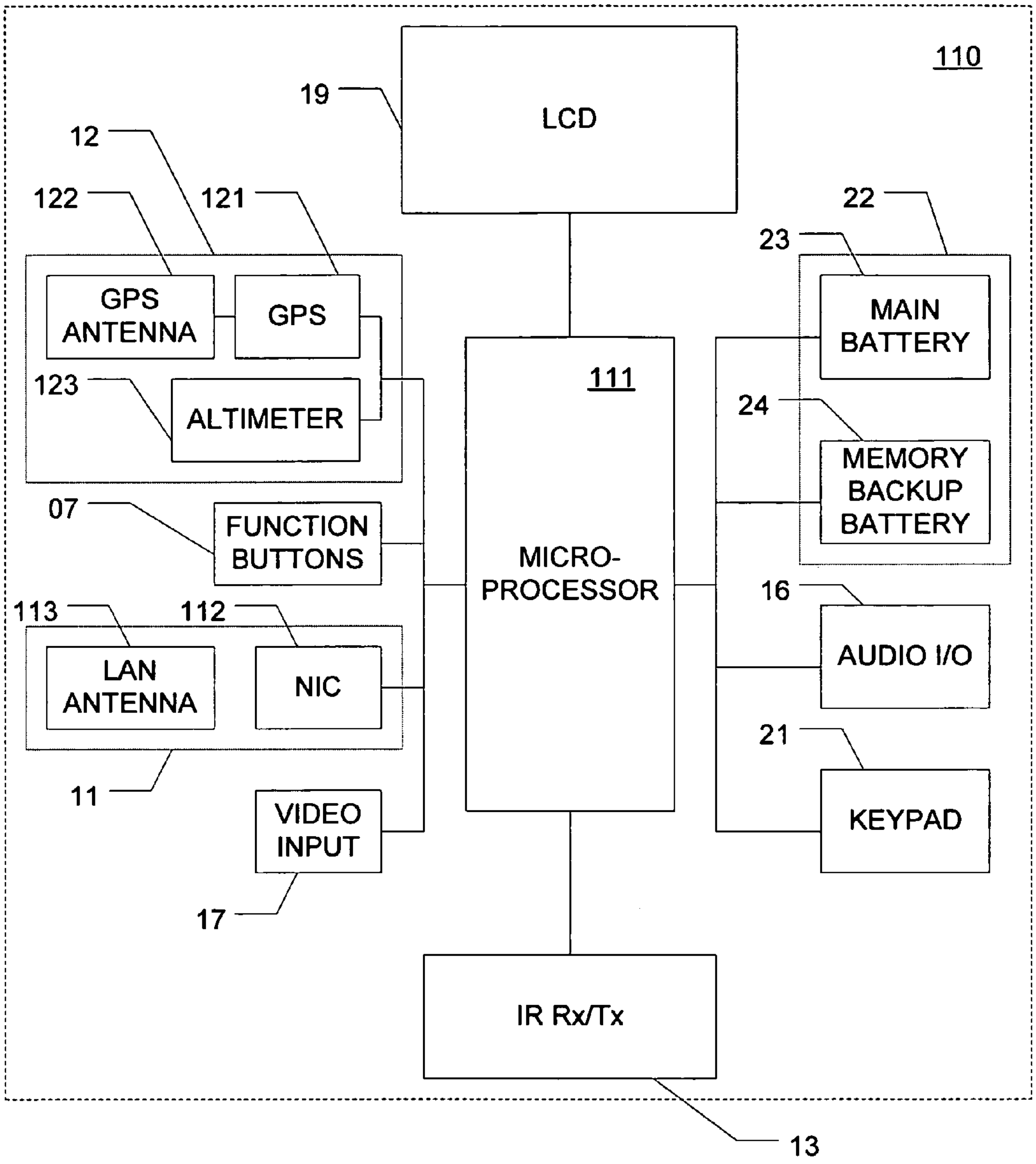
FIG. 8 is a block diagram of the internal computer hardware system of the PDA device of FIG. 7.

FIG. 8 is a block diagram of the internal computer hardware system 110 of the PDA device 10 of FIG. 7. Each PDA device 10 includes a microprocessor 111, a wireless network interface 11, a GPS subsystem 12, an infrared transceiver 13, audio I/O 16, a video input 17, a keypad 21 and a battery system 22. To minimize expense, the microprocessor 111 is preferably a commercially available reduced instruction set computing ("RISC")-based microprocessor such as the SA110 "StrongARM®"-type microprocessor available from Intel. The wireless network interface 11 preferably includes a network interface card ("NIC")

112 and an antenna 113. In a preferred embodiment, the wireless network interface 11 utilizes the IEEE 802.11b standard communications protocol for data transmissions at 11 Gbits/sec in the 2.4 GHz frequency range.

The keypad 21 and pushbuttons 07 together enable a user to input data, select options, and otherwise control the operation of the PDA device 10. Generally, the keypad 21 provides full operational control of the PDA device 10, while the pushbuttons 07 serve as "shortcut" keys to enable certain functions to be carried out with a minimum of effort and time. The battery system 22 preferably includes both a main general use battery 23 and a second battery 24, which may be a coin cell, for backing up the memory. The battery, system 22 may be recharged using the electrical contracts 09 illustrated in FIG. 7.

The GPS subsystem 12 includes a GPS device 121 and a dedicated antenna 122. The GPS device 121 may utilize any known GPS technology, including differential GPS ("DGPS"), whereby positional errors are corrected through the use of ground references having known coordinates; assisted GPS ("A-GPS"), whereby data is collected from multiple sources to improve precision; or the like. For indoor use, the GPS device 121 may utilize the GL-16000 32-bit bus indoor chip set or the GL-HSRF serial interface chipset, both from Fujitsu. For outdoor use, the GPS device 121 may utilize the onboard MLOC GPS receiver chipset.

Although many GPS units are capable of measuring position in the Z-direction (i.e., elevation), the GPS subsystem 12 may also include a separate altimeter 123 for making or supplementing this measurement. The altimeter 123, which may be an atmospheric pressure device or any other suitable device, preferably IC-based, may be incorporated in the PDA device 10 as shown or may be disposed elsewhere in the user's equipment 28.

It will be apparent to those of ordinary skill in the art that other types of positioning systems may be substituted for the GPS subsystem 12 described herein. For example, positioning systems utilizing ultra-wide band ("UWB") technologies are currently being developed, and other wireless technologies may likewise be used or developed for use in determining precise location data. As used herein, the term "GPS" should generally be understood to encompass or anticipate the use of such technologies, and the selection and implementation of a device or system making use of such a technology will likewise be apparent to one of ordinary skill in the art.

The infrared transceiver 13 is mounted to permit external line-of-sight infrared communication with a PASS system 20 when the PDA device 10 and at least a portion of the PASS system 20 are docked together. The infrared transceiver 13 permits data to be relayed from the PASS system 20 to the LAN 70, as described hereinbelow.

The audio I/O 16 includes connections for input from a microphone and output to a speaker, each of which are preferably located in the headgear 105. Using appropriate software, the microphone and speaker provide either full- or half-duplex radio communication and permit radio communications to be carried out with other common radios such as those from Motorola and Harris Corp. In one preferred embodiment, the software is off-the-shelf software such as conventional Microsoft or JoySoft Voip software. In another preferred embodiment, proprietary software may be developed that utilizes data compression algorithms.

The video input 17 permits the interconnection of a video data source, such as a video camera 60, to the PDA device 10, as described below. Preferably, the video input 17 includes an RS-170 standard video connector/interface or another standard video connector/interface together with a communications interface such as Springboard, Compact Flash, USB, or the like, the selection of which would be apparent to one of ordinary skill in the art based on the PDA device 10 being used, the camera 60 being used, and the like. The video input 17 permits data to be relayed from the video data source to the LAN 70, as described hereinbelow.

Figure 9:
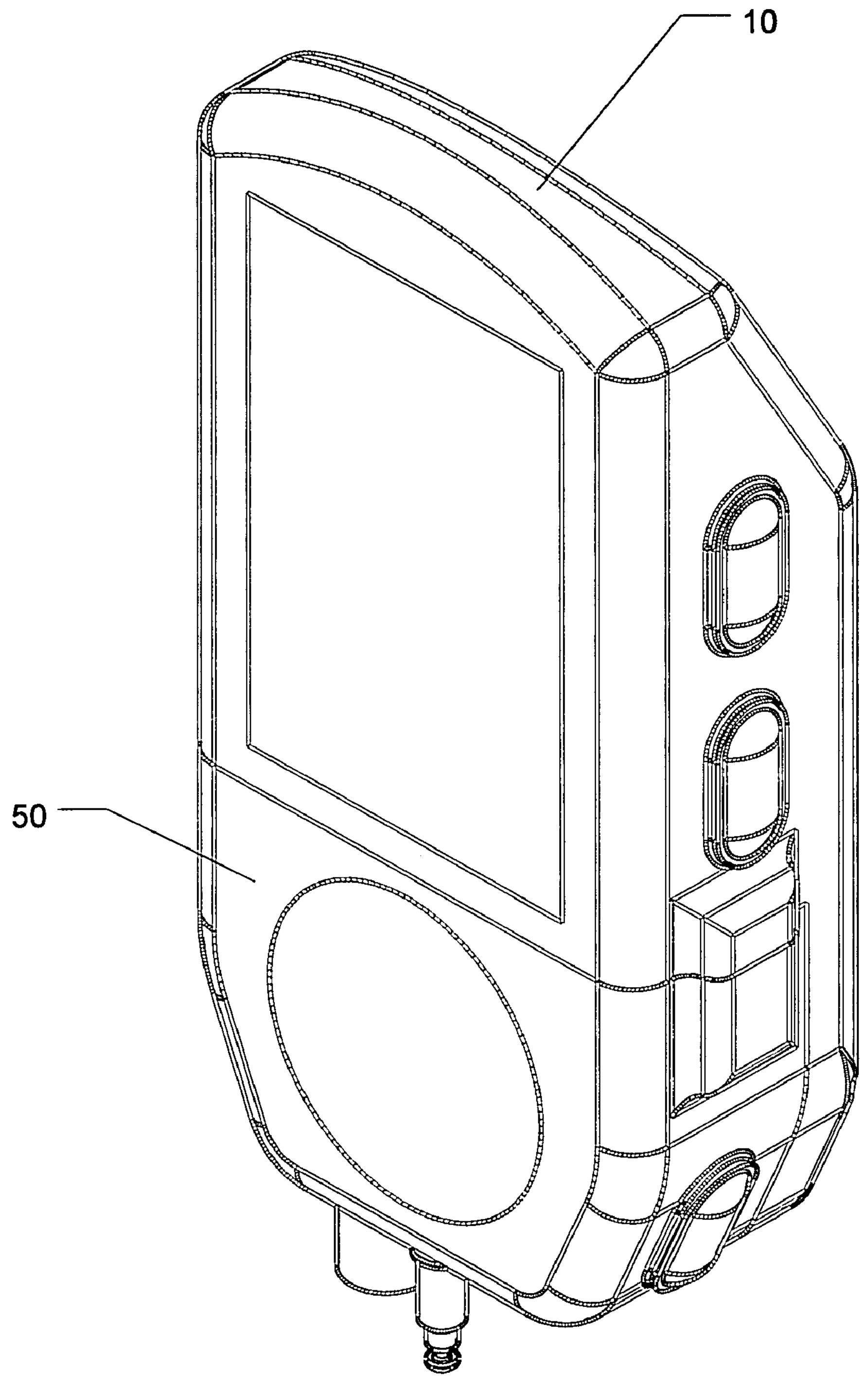
FIG. 9 is a perspective view illustrating the interconnection of the PDA device of FIG. 7 to the PASS control console of FIG. 5.

FIG. 9 is a perspective view illustrating the interconnection of the PDA device 10 of FIG. 7 to the PASS control console 50 of FIG. 5. As illustrated therein, the housing 51 of the PASS control console 50 is guided into place in the recess of the docking station 08 such that the pressure gauge 52 on the PASS control console 50 remains visible. Once in place, the latches may be used to releasably lock the PDA device 10 and the PASS control console 50 together. When properly latched, the infrared transceiver 59 of the PASS control console 50 is aligned with the infrared transceiver 13 of the PDA device 10, thus permitting line-of-sight communication between the two devices. It should also be noted that the docking process does not interfere with the pushbuttons 07, 53 on either device or the PASS unit interface 55 and the pressure line input 56 on the PASS control console 50.

Because firefighters and other personnel must frequently work in environments having low light or occluded surroundings, the video camera 60 is preferably an infrared or thermal imaging camera in order to add thermal awareness and enhanced visibility in such environments. By interfacing the video camera 60 with the PDA device 10, visual images generated by the video camera 60 may be displayed on the PDA display 19, thus potentially eliminating the need for a dedicated monitor on the video camera 60 itself. The video camera 60 is preferably mounted directly on the PDA device 10 as shown in FIG. 2 in order to enable the user to point the camera 60 in any desired direction. However, the camera 60 may alternatively be mounted elsewhere on the backpack 101, such as on the shoulder straps supporting the backpack 101, at or below shoulder height and oriented to face forward. Still further alternatively, the camera 60 may be mounted on the headgear 105, but this mounting location is less desirable because of the extra weight that is thus added to the headgear 105. Such extra weight may be uncomfortable for the wearer, and in addition may cause the weight of the headgear 105 to exceed specified limits.

If the camera 60 is to be mounted on the PDA device 10, then the camera may be provided with an electrical connector disposed in a location and at an orientation such that it may be electrically coupled to the video input 17 of the PDA device 10 when the camera 60 is docked to the PDA device 10. A latching system (not shown) may be provided to retain the camera 60 in this position on the PDA device 10. The latching system may include one or more latches/quick release mechanisms located on the top or back of the PDA device 10 with corresponding mechanisms on the back or sides of the camera 60. Advantageously, this direct connection between the camera 60 and the PDA device 10 minimizes delay in capturing data from the camera 60 on the PDA device 10 and avoids the risk of an extra cable becoming entangled in other equipment 28 or with the wearer's surroundings. It also may permit the use of a shared battery system between the PDA device 10 and the camera 60, thereby enhancing power efficiency.

In operation, the PDA device 10 enables a variety of data to be transmitted to and from the PDA device 10, thus providing the firefighter or other user carrying the PDA device 10 with a considerably greater tool set with which to work. To use the PDA device 10, the battery system in the PDA device 10 is first recharged using the electrical contacts 09. Once charged, the PDA device 10 is attached to the PASS control console 50 by latching the PASS control console 50 to the PDA device 10 as described hereinabove. The docking procedure triggers an automatic boot procedure and provides onscreen instructions and options to the user. Also, if desired, a video camera 60 may be attached to the PDA device 10 such that the video camera output is connected to the video input 17 of the PDA device 10. The presence of a video camera 60 is also preferably detected automatically by the PDA device 10. Once connected, digital images may be captured by the video camera 60 and transferred to the PDA device 10 via the video input 17 of the PDA device 10. The operating components of a thermal imaging camera suitable for use with the present invention are available in the Eagle 160 camera available from Scott Health & Safety of Monroe, N.C.

Once the PDA device 10 is operational, it begins gathering data from a variety of sources. For example, on a periodic basis, the GPS subsystem 12 makes a positional determination using the GPS satellite constellation 68, in accordance with conventional GPS operations. If the GPS subsystem 12 includes a separate altimeter 123, then the microprocessor 111 may derive an additional vertical elevation measurement in conjunction with the X, Y and optional Z data developed by the GPS device 121. When considered in the sequence in which they were determined, preferably in conjunction with an indication of the time at which they were determined, these readings form a "bread crumb" trail that reflects the path taken by the PDA device 10 as it was carried along by its owner.

Also, the PDA device 10 preferably receives data from the PASS system 20 via the infrared transceiver 13. The data may be received on a periodic basis, or the data may be received continuously. If received continuously, the PDA device 10 may ignore some of the data or may process all of it, as desired. The data received may include any data available to the PASS system 20. Preferably, the data received includes at least an indication of the amount of air remaining in the air tank 104 and status information derived from the motion sensor module 31. The data may also include other status information, environmental data gathered by the PASS unit 30, biometric data gathered by the PASS unit 30, and the like. Preferably, all information or data received from the PASS system 20 is time-coordinated with the GPS data so that at least some of the GPS readings are aligned in time with at least some of the PASS data.

At any time, the PDA device 10 may also receive other data input by the firefighter or other user carrying the PDA device 10. For example, the PDA device may receive voice data and other ambient noise data from the microphone, or may receive data input by the user via the keypad 21 or pushbuttons 07. Preferably, all of this data is coordinated with GPS data and PASS data.

In addition, if a video camera 60 is connected to the PDA device 10, the PDA device 10 may receive, at any time, video data (which may include audio data) from the video camera 60 via the video input 17. Video data from the camera 60 may be displayed on the PDA display 19 for viewing by various emergency personnel to assist in locating thermally intense zones, to see through dense smoke, or to locate victims or other emergency personnel.

Other data may be gathered in the PDA device 10 using a variety of other peripheral devices and interfaces. Preferably, the PDA device 10 is further equipped with a variety of standard I/O and interfaces for this purpose. For example, each PDA device 10 preferably further includes one or more USB ports, one or more PCMCIA slots, and/or other connectors and interfaces.

As various types of data are received by the PDA device 10, the data is processed by the microprocessor 111, and some or all of the data may be buffered in a memory that is preferably at least 128 MB in size. In addition, at least some of the data is transmitted via the wireless network interface 11 to the user's wireless LAN 70. Thus, not only may a firefighter's PASS system 20 may be monitored remotely to determine the status of his air tank 104 or whether the firefighter may be injured or otherwise debilitated, but position data (GPS, dead reckoning or both), audio data from the microphone, video data from the camera 60, stored or user-input data from the PDA device 10, and environmental or biometric data gathered by the PASS unit 30 may all likewise be transmitted as well.

The data is preferably transmitted in such a way that data received from the various sources at the same time is transmitted together (or in close proximity) so that a maximum amount of data for each point in time is grouped together. This enables a fuller "snapshot" of an emergency worker's situation in a dangerous area to be made available, using appropriate software, to personnel located at a command center. Thus, for example, if a firefighter's motion sensor indicates that his PASS system 20 has been motionless for more than the predetermined maximum period of time, then the positional data (GPS, dead reckoning or both) corresponding in time to the motion sensor data may be consulted to determine where the firefighter was when the PASS system 20 stopped moving. If desired, the complete "bread crumb" trail left by the firefighter's GPS subsystem 12 may be studied in order to determine how to reach the firefighter. Preferably, the bread crumb trail may then be downloaded directly from the wireless LAN 70 into another firefighter's PDA device 10 for direct, on-the-scene use without having to exit the building or return to the truck. Similarly, video data may be coordinated with positional data to provide information to a command center as to the precise location of a particular situation captured by the video camera 60, or audio data may be combined with PASS data to provide information about what a firefighter was saying or doing when his PASS unit 30 indicated that he became motionless. Of course, it will be apparent to those of ordinary skill in the art that a wide variety of useful combinations of data may be provided by the system of the present invention.

Because of the large amounts of bandwidth required to transmit video data, certain concessions may be necessary with regard to such transmissions. For example, in one embodiment, if video data is being transmitted, then audio data from the user's microphone is not transmitted. In another approach, video images from the camera 60 may be compressed using MPEG or similar methods before being stored and/or transmitted.

The command center preferably further includes the truck-based GPS unit 65. The truck-based GPS unit 65 includes a GPS device, a dedicated antenna, a controller, and a GPS almanac. Because the truck-based GPS unit 65 is located in relatively close proximity to each firefighter or other worker and his GPS-equipped PDA device 10, small errors in the GPS data derived by a particular PDA device 10 may be accounted for using the readings from the truck-based GPS unit 65.

In addition to transmitting data gathered from various on-board subsystems, each PDA device 10 is preferably capable of receiving data from other personal communication systems 15 and other points or nodes in the LAN 70. Incoming data may be received at the antenna 113 and relayed to the microprocessor 111 via the NIC 112. Such data may include any data transmitted from another personal communication system 15 as well as similar data transmitted from a command center or similar node in the LAN 70. Thus, for example, video data from the camera 60 of the personal communication system 15 of a first user may be transmitted via the PDA device 10 of that system 15 to a second user's personal communication system 15, where it may be processed and displayed on the display 19 of the second system's PDA device 10. This would permit several team members to see video captured by another team member acting as a scout. Similarly, positional data, audio data and the like may likewise be shared. In addition, data such as text messages, map or floorplan data, and the like may be transmitted from a command center to the personal communication systems 15 of one or more personnel and displayed to them via the displays 19 of their respective PDA devices 10.

In another feature of the present invention, each PDA device 10 may operate as a repeater unit for relaying data from other PDA devices 10 located in relatively close proximity. However, unlike previous systems that use deployable, dedicated repeaters to increase effective transmission distances, the system of the present invention, instead utilizes a peer-to-peer mesh network technology to achieve greater transmission distance. The PASS control console 50 of each individually-issued PASS system 20 is capable of full duplex transmissions with other PASS consoles 50, using the 802.11 standard protocol, to form a mesh network architecture that does not rely on a central base station, router or access point to relay the data transmissions to the other client devices. All PASS control consoles 10 within the network act as repeaters, transmitting data (including voice, PASS data, dead reckoning and GPS coordinate data, video, and the like) from one device to the next device until the data packet has reached its final destination. Thus, for example, one firefighter may be in an area of a building from which direct communication with his wireless LAN 70 is impossible or unreliable, but because each PDA device 10 may be used to relay data from other PDA devices 10, data from the firefighter's PDA device 10 may be relayed to the wireless LAN 70 by another PDA device 10 in the area. Thus, a PDA device 10 may also be used or modified to serve as a GPS location beacon, a data packet repeater, a "camera on a stick," an unmanned drop sensor for sensing and relaying data, a personal In unit, and the like.

It will be apparent that locating and tracking individual devices in a mesh network is also possible without requiring the use of GPS. However, the degree of accuracy may vary, and the use of a combination of dead reckoning with GPS, as described previously, can increase the accuracy to within +/−5 meters.

The peer-to-peer 802.11 mesh networking technology creates a mobile network without the need of any existing infrastructure. This mobile wireless LAN 70 may further be wirelessly interfaced with the WAN 80 (or a cell network) to facilitate communication and distribution of data over a larger area. Tie in may be provided through a base station, typically residing on a fire truck, since existing networks require interface hardware to address different network protocols. The WAN 80 may connect together other LAN's 70 on the scene; battalion equipment, including maintenance and support elements as well as equipment from the next higher echelon; land line communications, including to a GPS almanac service; the internet; hospitals, local government and other emergency agencies; and the like.

Figure 10:
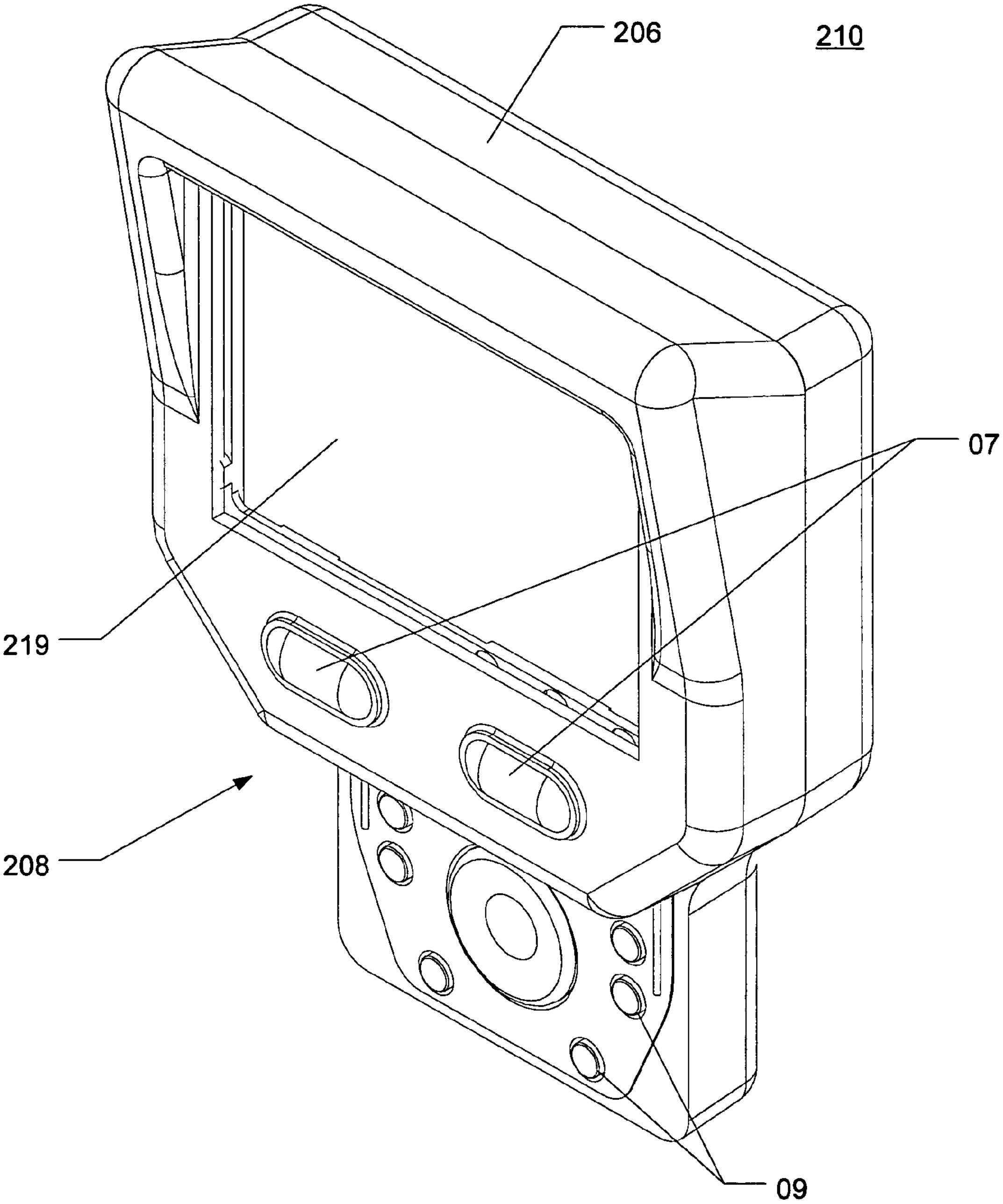
FIG. 10 is a perspective view of an alternative embodiment of the PDA device of FIG. 1.

FIG. 10 is a perspective view of an alternative embodiment of a PDA device 210 for use in the system and network 05 of FIG. 1. The PDA device 10 includes a housing 206, a display 19, one or more pushbuttons 07, a keypad 21 (shown only in FIG. 8) a docking station 08, an internal computer hardware system 110, illustrated in FIG. 8, and a corresponding software system. The components are generally similar to, that of the first-described PDA device 10, except that the housing 206 utilizes a different design in order to incorporate a "landscape"-type display 219. The docking station 08 is likewise modified relative to the first-described PDA device 10 because of the different dimensions and shape of the rest of the housing 206.

Figure 11:
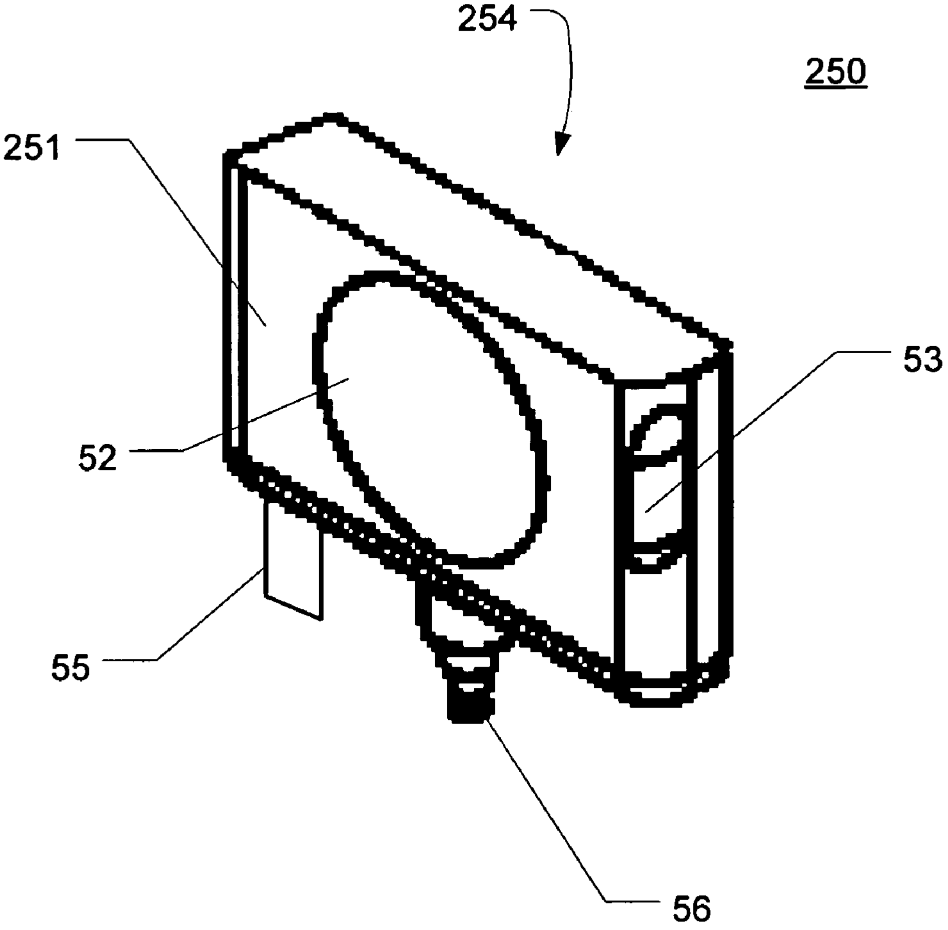
FIG. 11 is a perspective view of an alternative embodiment of the PASS control console of FIG. 1.

FIG. 11 is a perspective view of an alternative embodiment of a PASS control console 250 for use in the system and network 05 of FIG. 1. The alternative PASS control console 250 includes a housing 251, a pressure gauge 52, one or more pushbuttons 53, a docking interface 254, a PASS unit interface 55, a pressure line input 56, an internal computer hardware system 150, illustrated in FIG. 6, and a corresponding software system. The components are generally similar to that of the first-described PASS control console 50, except that the housing 251 utilizes a different design in order to accommodate the different design of the housing 206 of the alternative PDA device 210 illustrated in FIG. 10.

Figure 12:
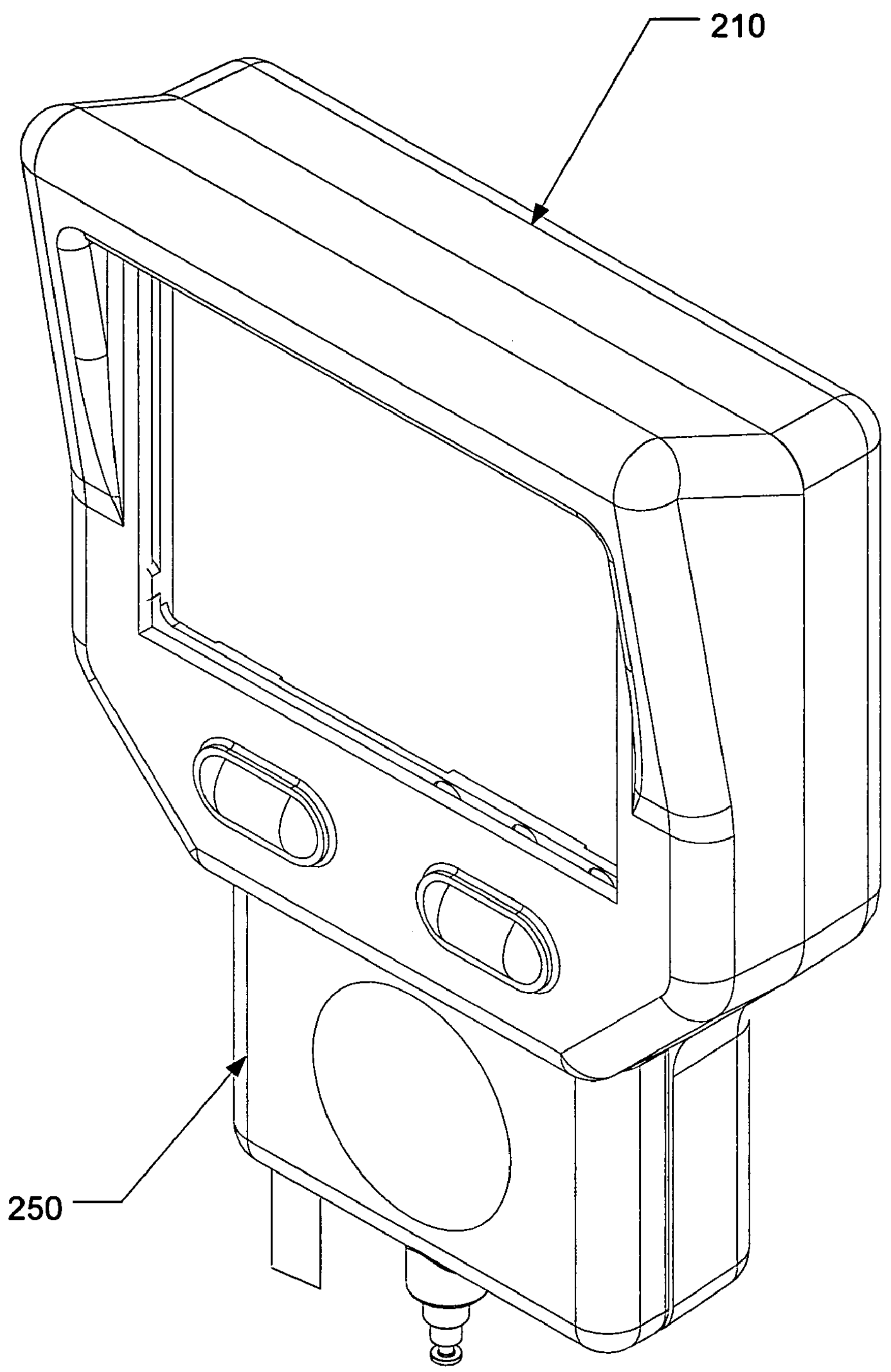
FIG. 12 is a perspective view illustrating the interconnection of the PDA device of FIG. 10 to the PASS control console of FIG. 11.

FIG. 12 is a perspective view illustrating the interconnection of the PDA device 210 of FIG. 10 to the PASS control console 250 of FIG. 11. As illustrated therein, the housing 251 of the alternative PASS control console 250 is guided into place in the recess of the docking station 208 such that the pressure gauge 52 on the alternative PASS control console 250 remains visible. Once in place, the latches may be used to releasably lock the alternative PDA device 210 and the alternative PASS control console 250 together. When properly latched, the infrared transceiver 59 of the alternative PASS control console 250 is aligned with the infrared transceiver 13 of the alternative PDA device 210, thus permitting line-of-sight communication between the two devices 250, 210. It should also be noted that the docking process does not interfere with the pushbuttons 07, 53 on either device or the PASS unit interface 55 and the pressure line input 56 on the alternative PASS control console 250.

Figure 13:
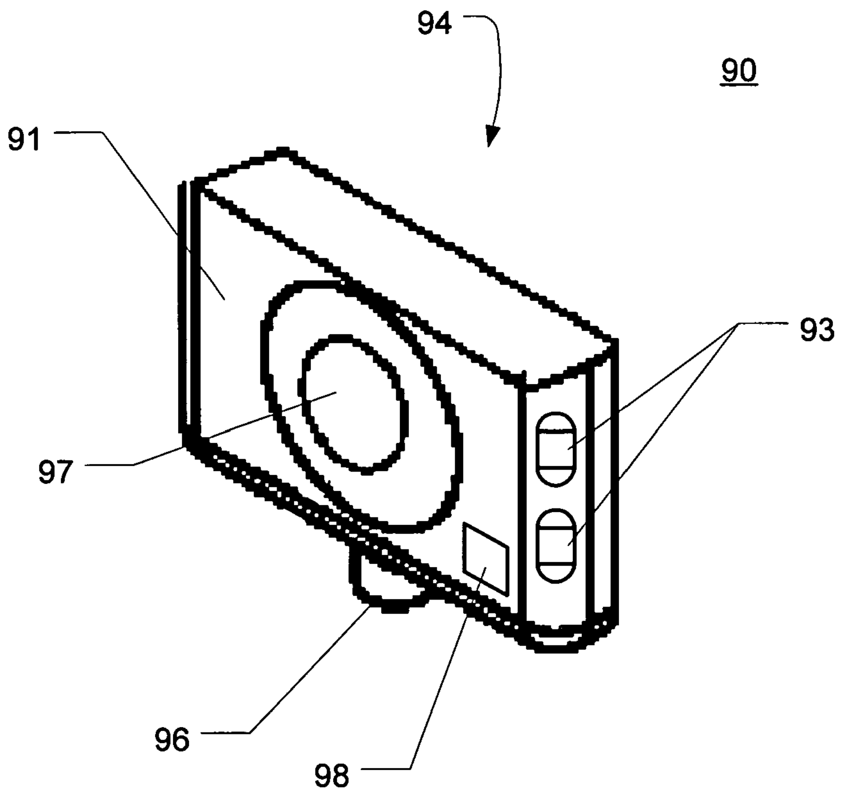
FIG. 13 is a perspective view of a mini-PASS unit.

In an alternative embodiment, any PASS system 20 may instead include only a unitary mini-PASS unit 90, thus dispensing with a PASS unit that is separate from the PASS control console. Mini-PASS units 90 are typically utilized by workers who are not equipped with an SCBA and thus do not require the full functionality of a conventional PASS unit 30. FIG. 13 is a perspective view of a mini-PASS unit 90. The mini-PASS unit 90 includes a housing 91, one or more pushbuttons 93, a docking interface 94, one or more visual indicators 98, such as LED's, a electronics input 96, a piezo alarm 97, an internal computer hardware system 190, illustrated in FIG. 14, and a corresponding software system. As illustrated, the housing 91, pushbuttons 93 and docking interface 94 are generally similar to the housing 51, pushbuttons 53 and docking interface 54, respectively, of the alternative PASS control console 250 of FIG. 11, but it will be apparent that the various components could also be applied to the first-described PASS control console 50 illustrated in FIG. 5 as well. The piezo alarm 97 is a sound generator that is activated when a motion sensor 192 (shown in FIG. 14), disposed within the mini-PASS unit 90, indicates that the mini-PASS unit 90 has been motionless for a predetermined period of time. The LED's include a backup light that is likewise activated when the motion sensor 192 indicates that the PASS unit 90 has been motionless for the predetermined period of time. Because the mini-PASS unit 90 includes only a single component, there is no need for an interface such as the PASS unit interface 55 illustrated in FIG. 11. However, an electronics input 96 may be provided to provide a means for receiving data from other onboard electronic devices similar to those referenced in the description of the PASS unit 30 of the first embodiment.

Figure 14:
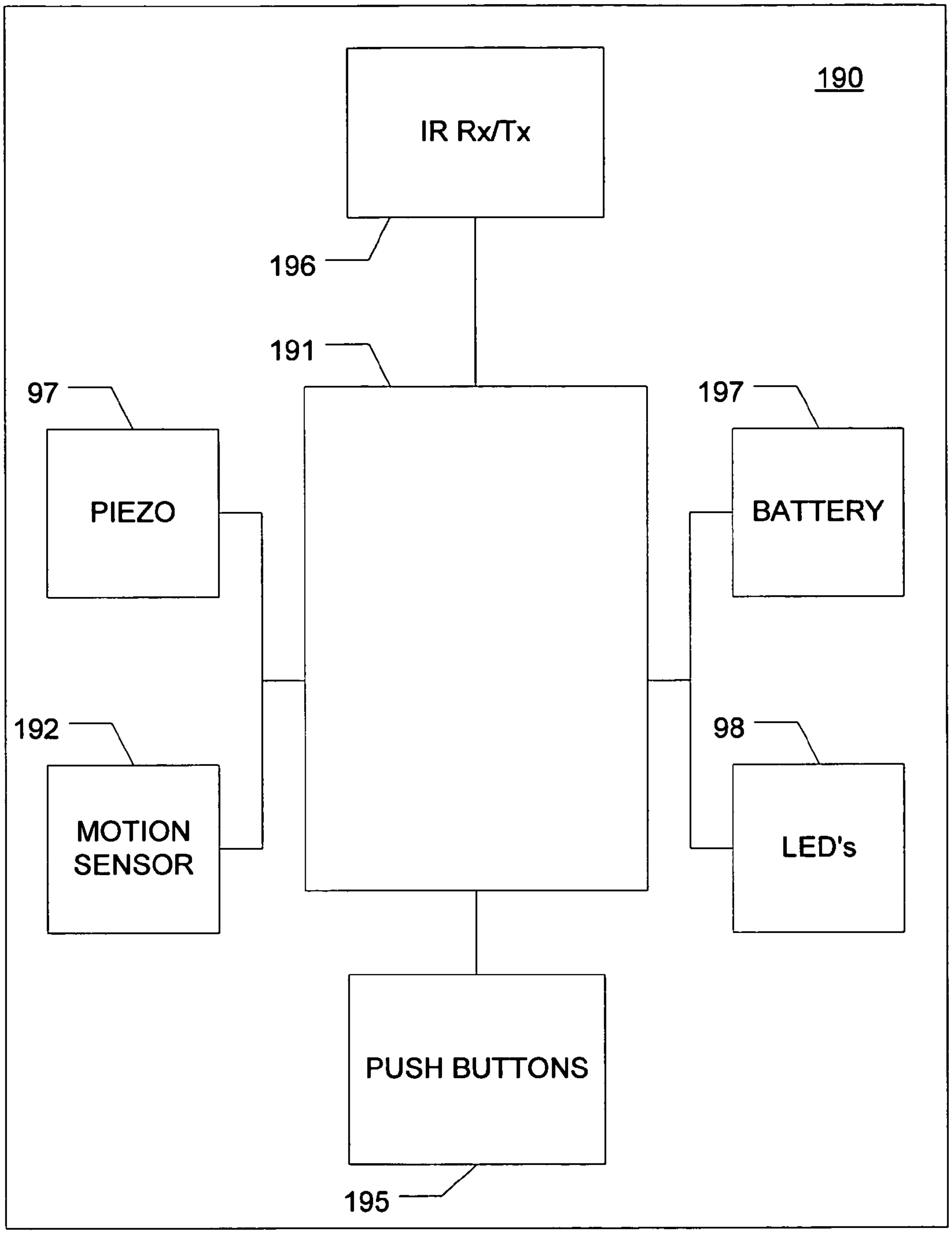
FIG. 14 is a block diagram of the internal computer hardware system of the mini-PASS unit of FIG. 13.

FIG. 14 is a block diagram of the internal computer hardware system 190 of the mini-PASS unit 90 of FIG. 13. The internal computer hardware system 190 for each mini-PASS unit 90 preferably includes a microcontroller 191, the motion sensor 192 described previously, a connection to the piezo alarm 97, a connection to each visual indicator 98, connections to the pushbuttons 93, an infrared transceiver 196 and a battery 197. Briefly described, the motion sensor 192 is operative with the microcontroller 191 to provide an indication as to whether the mini-PASS unit 90 has been motionless for a predetermined period of time; the piezo alarm 193 is a sound generator that is activated when the motion sensor 192 indicates that the mini-PASS unit 90 has been motionless for the predetermined period of time; the LED's include lights that are activated when the motion sensor 192 indicates that the PASS unit 90 has been motionless for the predetermined period of time; and the infrared transceiver 196 is mounted externally to permit line-of-sight infrared communication with the alternative PDA device 210 when the mini-PASS unit 90 and the alternative PDA device 210 are docked together. Many of the components of the internal computer hardware system 190 may be conventional components such as those found in the standard mini-PASS unit manufactured by Scott Technologies of Monroe, N.C.; however, modifications to a conventional mini-PASS unit, apparent to one of ordinary skill in the art, may be necessary to make it suitable for use with the present invention.

Figure 15:
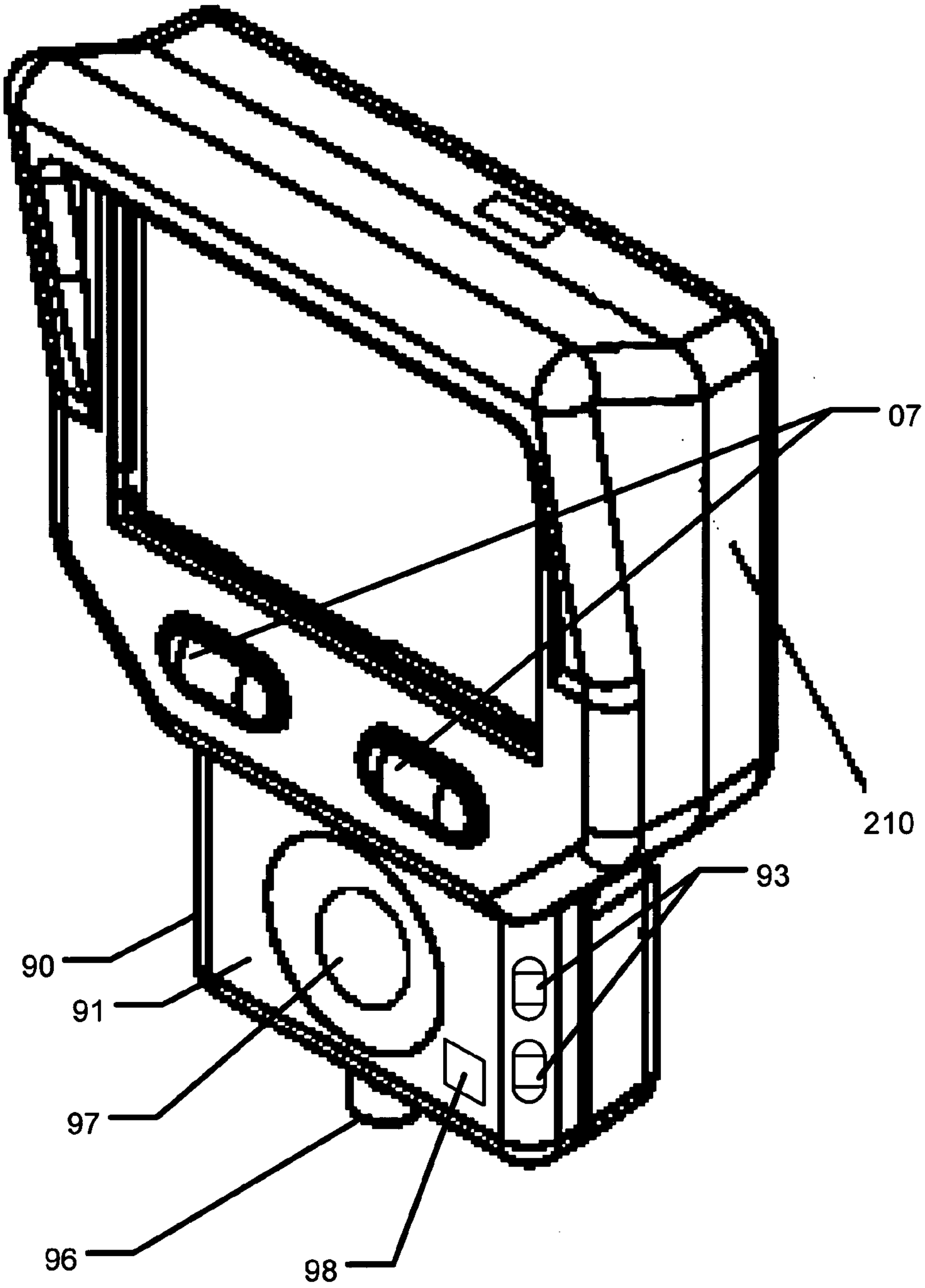
FIG. 15 is a perspective view illustrating the interconnection of the PDA device of FIG. 10 to the mini-PASS unit of FIG. 13.

FIG. 15 is a perspective view illustrating the interconnection of the alternative PDA device 210 of FIG. 10 to the mini-PASS unit 90 of FIG. 13. The housing 91 of the mini-PASS unit 90 may be guided into place in the recess of the docking station 208 such that the pressure gauge 92 on the mini-PASS unit 90 remains visible. Once in place, the latches may be used to releasably lock the PDA device 210 and the mini-PASS unit 90 together. When properly latched, the infrared transceiver 196 of the mini-PASS unit 90 is aligned with the infrared transceiver 13 of the PDA device 210, thus permitting line-of-sight communication between the two devices 90, 210. It should also be noted that the docking process does not interfere with the pushbuttons 07, 93 on either device or the pressure line input 96 on the mini-PASS unit 90. Further, although the mini-PASS unit 90 is only shown docked with the alternative PDA device 210, it should be apparent that the mini-PASS unit 90 may likewise be used with the first PDA device 10 described previously.

As noted previously, mini-PASS units 90 are typically used by personnel who are not carrying SCBA equipment and thus do not have an air tank 104 to be monitored. However; their operation is otherwise similar to that of conventional PASS units 30 in that data provided by a mini-PASS unit 90 may be relayed by the PDA device 10 in a manner similar to that of conventional PASS units 30 and PASS control consoles 50.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A communications network for emergency personnel, comprising:

a base station configured to communicate bi-directionally with first and second personal communication systems (PCS) to be carried by respective first and second firefighters in a hazardous environment, wherein each of the first and second personal communication systems includes an onboard data gathering device and at least one wireless transceiver, the wireless transceivers of the first and second PCS being configured to communicate with one another over a peer to peer mesh network and to communicate with the base station over the peer to peer mesh network, the onboard data gathering device in the first PCS collecting PASS data from a PASS system carried by the first firefighter, the transceiver in the first PCS broadcasting the PASS data associated with the first firefighter over the peer to peer mesh network to the second PCS, the transceiver in the second PCS broadcasting the PASS data associated with the first firefighter to the base station.

2. The communications network of claim 1, wherein the PASS data includes status information derived from a motion sensor indicating that the personal communication system has been motionless for a predetermined period of time.

3. The communications network of claim 1, wherein the onboard data gathering device collects SCBA data from an SCBA system carried by the firefighter, the SCBA data including an indication of an amount of air remaining in an air tank of the SCBA system.

4. The communications network of claim 1, wherein the second PCS includes an output to present, to the second firefighter, the PASS data associated with the first firefighter and transmitted by the transceiver of the first PCS to the transceiver of the second PCS.

5. The communications network of claim 1, wherein the second PCS includes a display to display, to the second firefighter, the PASS data associated with the first firefighter and transmitted by the transceiver of the first PCS to the transceiver of the second PCS.

6. The communications network of claim 1, wherein the onboard data gathering device in each of the first PCS and second PCS includes a positional data gathering device that obtains position data regarding a location of the corresponding firefighter, the transceivers transmitting the position data over the peer to peer mesh network.

7. The communications network of claim 1, wherein the onboard data gathering device in each of the first and second PCS includes one of i) a GPS unit and ii) a dead reckoning device, that obtains position data regarding a location of the corresponding firefighter, the transceivers transmitting the position data over the peer to peer mesh network.

8. The communications network of claim 1, further comprising a positional data gathering device, communicatively coupled to the transceiver in the first PCS, the positional data gathering device determining and conveying position data identifying a location of the corresponding firefighter to the transceiver in the first PCS, the transceiver in the first PCS broadcasting the position data associated with the first firefighter to the second PCS over the peer to peer mesh network, the transceiver in the second PCS broadcasting the positional information associated with the first firefighter to the base station over the peer to peer mesh network.

9. The communications network of claim 1, further comprising a positional data gathering device that repeatedly identifies a location of the corresponding firefighter and produces a sequence of position information that is transmitted by the transceiver in the first PCS over the peer to peer mesh network, the sequence of position information representing a path taken by the corresponding firefighter.

10. The communications network of claim 1, wherein the onboard data gathering device in each of the first and second PCS includes at least one of a thermal imaging camera and a video camera, the transceivers broadcasting video data from the at least one of a thermal imaging camera and a video camera.

11. The communications network of claim 1, wherein the onboard data gathering device in each of the first and second PCS includes a positional data gathering device and a video camera, the transceivers broadcasting position data from the positional data gathering device and thermal image data from the thermal imaging camera.

12. The communications network of claim 1, wherein the transceiver of the second PCS receives command data from the base station over the peer to peer mesh network, the command data being addresses to the first PCS, the second PCS broadcasting the command data over the peer to peer mesh network to the first PCS.

13. The communications network of claim 1, wherein the transceiver of the first PCS broadcasts the PASS data in data packets in accordance with a protocol, the data packets including identification information identifying the first PCS, at which the PASS data originated.

14. The communications network of claim 1, wherein the onboard data gathering devices and transceivers are integrated into a common housing with the PASS system.

15. The communications network of claim 1, wherein the onboard data gathering devices receive position information and time coordinate the position information with the PASS data.

16. A method for providing a communications network for emergency personnel, comprising:

providing first and second personal communication systems (PCS) to be carried by respective first and second firefighters in a hazardous environment, wherein each of the first and second personal communication systems includes an onboard data gathering device and a transceiver;

configuring a base station to communicate wirelessly bi-directionally with the first and second PCS;

configuring the transceivers of the first and second PCS to communicate with one another over a peer to peer mesh network and to communicate with the base station;

configuring the onboard data gathering device in the first PCS, to collect PASS data from a PASS system carried by the first firefighter;

configuring the transceiver in the first PCS, to broadcast the PASS data associated with the first firefighter over the peer to peer mesh network to the second PCS; and configuring the transceiver in the second PCS, to re-broadcast the PASS data associated with the first firefighter to the base station.

17. The method of claim 16, wherein the PASS data includes status information derived from a motion sensor indicates that the first PCS has been motionless for a predetermined period of time.

18. The method of claim 16, further comprising configuring the onboard data gathering device of the first PCS to collect SCBA data from an SCBA system carried by the firefighter, the SCBA data including an indication of an amount of air remaining in an air tank of the SCBA system.

19. The method of claim 16, further comprising providing the second PCS with an output to present, to the second firefighter, the PASS data associated with the first firefighter and transmitted by the transceiver of the first PCS to the transceiver of the second PCS.

20. The method of claim 16, further comprising providing the onboard data gathering device in each of the first PCS and second PCS with a positional data gathering device that obtains position data regarding a location of the corresponding firefighter, the transceivers transmitting the position data over the peer to peer mesh network.

21. The method of claim 16, further comprising providing the onboard data gathering device in each of the first PCS and second PCS with one of i) a GPS unit and ii) a dead reckoning device, that obtains position data regarding a location of the corresponding firefighter, the transceivers transmitting the position data over the peer to peer mesh network.

22. The method of claim 16, further comprising:

determining position data identifying a location of the first PCS;

broadcasting the position data associated with the first PCS to the second PCS over the peer to peer mesh network; and rebroadcasting the positional data associated with the first firefighter from the second PCS to the base station over the peer to peer mesh network.

23. The method of claim 16, further comprising:

broadcasting command data from the base station over the peer to peer mesh network, the command data being addresses to the first PCS;

receiving and re-broadcasting, at the second PCS, the command data over the peer to peer mesh network; and receiving the command data that is re-broadcast by the second PCS at the first PCS.

24. The method of claim 16, further comprising formatting the PASS data in data packets in accordance with a protocol, and including, within the data packets, identification information identifying the first PCS, at which the PASS data originated.

25. A method of communicating multimedia data from a personal communication system carried by a firefighter to a base station, the method comprising:

gathering first and second data at a first personal communication system (PCS) carried by a first firefighter in a hazardous environment, the first data being indicative of at least one of a condition of the firefighter and a condition of onboard systems carried by the firefighter, the second data being indicative of the other of the condition of the firefighter and the condition of onboard systems carried by the firefighter;

wirelessly broadcasting at least one of the first and second data from the first PCS over a peer to peer mesh network; receiving the first data, over the network, at a second PCS carried by a second firefighter;

wirelessly broadcasting, from the second PCS, the first data; and receiving, at a base station, the first data broadcast by the first PCS.

26. The method of claim 25, further comprising obtaining a unique identifier associated with at least one of the first firefighter and the first PCS carried by the first firefighter and broadcasting the unique identifier with the at least one of the first and second data from the first PCS.

27. The method of claim 25, wherein the first data includes status information derived from a motion sensor indicates that the personal communication system has been motionless for a predetermined period of time.

28. The method of claim 25, wherein the second data including an indication of an amount of air remaining in an air tank of an SCBA system.

29. The method of claim 25, further comprising presenting, to a second firefighter, at least one of the first and second data associated with the first firefighter and transmitted by the first PCS to the second PCS.

30. The method of claim 25, wherein the first stream of position data provides a trail representing a path taken by a firefighter.

31. The method of claim 25, wherein the PCS is integrated into a PASS unit carried by the firefighter.

32. A personal communication system to be carried by a firefighter in a hazardous environment, comprising:

a PASS unit to be carried by a firefighter, the PASS unit including a motion sensor for detecting motion of the firefighter and producing motion information based thereon;

a SCBA system to be carried by a firefighter, the SCBA system producing SCBA status data indicative of a condition of the SCBA system;

a communications device obtaining at least one of motion information from the PASS unit and SCBA status data from the SCBA system, the communications device having a unique identifier associated therewith, the communications device including a transceiver that broadcasts the unique identifier and at least one of the motion information and SCBA status data over a peer to peer mesh network that relays bidirectional transmissions through other personal communications systems to a remote location.

33. The personal communications system of claim 32, wherein the transceiver receives at least one of motion information and SCBA status information associated with, and broadcast by, a different personal communications system, the transceiver re-broadcasting the unique identifier and the at least one of motion information and SCBA status information received.

34. The personal communication system of claim 32, further comprising a video camera electrically connected to the communications device such that video data from the video camera may be transmitted over the peer to peer mesh network.

35. The personal communication system of claim 32, further comprising a thermal imaging camera electrically connected to the communications device such that data from the thermal imaging camera may be transmitted by the transceiver over the peer to peer mesh network.

36. The personal communication system of claim 32, further comprising a display adapted to display at least one of motion information and SCBA status information received.

37. The personal communication system of claim 32, wherein the transceiver utilizes an 802.11 standard protocol and broadcasts at a frequency of approximately 2.4 GHz.

38. The personal communication system of claim 32, further comprising one of a video camera, microphone, GPS device, biometric sensor, and an environmental sensor.

39. The personal communication system of claim 32, further comprising a biometric sensor for measuring at least one of the body temperature, pulse rate and $CO_2$ of the firefighter.

40. The personal communication system of claim 32, further comprising at least one of an environmental sensor, an environmental temperature sensor, and a gas sensor.

41. The personal communication system of claim 32, wherein the communications device includes a display and the transceiver is configured to receive video data over the peer to peer mesh network from a remote different personal communications system, the display displaying the video data received from the remote different personal communications system.

42. The personal communications system of claim 32, further comprising a PASS control console joined to a pressure line of the SCBA system, the pressure line including an electronics cable joined thereto, the electronics cable joining the PASS control console and the communications device.

43. The personal communications system of claim 32, wherein the communications device and PASS unit are integrated with one another and provided a common housing.

44. The personal communications system of claim 32, wherein the communications device is a PDA device and includes a display and a keypad held in a PDA housing.

* * * * *